US010606801B2

(12) United States Patent
Thakkar et al.

(10) Patent No.: US 10,606,801 B2
(45) Date of Patent: *Mar. 31, 2020

(54) METHOD AND SYSTEM OF RETRIEVING DATA IN A DATA FILE

(71) Applicant: PIXIA CORP., Herndon, VA (US)

(72) Inventors: Rahul C. Thakkar, Leesburg, VA (US); Scott L. Pakula, Chantilly, VA (US)

(73) Assignee: PIXIA CORP., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,052

(22) Filed: May 11, 2018

(65) Prior Publication Data

US 2018/0293247 A1  Oct. 11, 2018

Related U.S. Application Data

(63) Continuation of application No. 14/944,919, filed on Nov. 18, 2015, now Pat. No. 9,998,524, which is a
(Continued)

(51) Int. Cl.
*H04L 29/08* (2006.01)
*G06F 16/11* (2019.01)
(Continued)

(52) U.S. Cl.
CPC .......... *G06F 16/122* (2019.01); *G06F 16/188* (2019.01); *G06F 16/22* (2019.01);
(Continued)

(58) Field of Classification Search
CPC ................ G06F 16/122; G06F 16/188; H04L 29/08117; H04L 65/4084; H04L 65/602;
(Continued)

(56) References Cited

U.S. PATENT DOCUMENTS 5,911,776 A    6/1999  Guck
5,987,479 A   11/1999  Oliver
(Continued)

OTHER PUBLICATIONS

International Search Report dated Jul. 18, 2014 for Appln No. PCT/US2013/73160.
(Continued)

*Primary Examiner* — Chirag R Patel
(74) *Attorney, Agent, or Firm* — Pillsbury Winthrop Shaw Pittman LLP

(57) ABSTRACT

A method and system for requesting information from a server are provided. The method may include sending, by a client to a server, an HTTP GET request to retrieve at least a portion of at least one derived data file, the at least one derived data file being dynamically generated by the server in response to the request using a data file virtualization policy and at least a portion of a data file. The data file virtualization policy and the data file may be stored in a storage accessible by the server, and the dynamic generation may comprise an aligned unbuffered direct read operation from the stored data file of a data size that is aligned to an integer multiple of the storage's block size. The at least the portion of the at least one derived data file may then be received by the client from the server.

20 Claims, 17 Drawing Sheets

Related U.S. Application Data continuation of application No. 13/779,275, filed on Feb. 27, 2013, now Pat. No. 9,239,855.

(60) Provisional application No. 61/733,228, filed on Dec. 4, 2012.

(51) Int. Cl.
  *G06F 16/22*  (2019.01)
  *G06F 16/188* (2019.01)
  *H04L 29/06*  (2006.01)

(52) U.S. Cl.
  CPC ........ *H04L 29/08117* (2013.01); *H04L 67/02* (2013.01); *H04L 67/06* (2013.01); *H04L 67/1097* (2013.01); *H04L 67/42* (2013.01); *H04L 65/4084* (2013.01); *H04L 65/602* (2013.01); *H04L 65/607* (2013.01)

(58) Field of Classification Search
  CPC ....... H04L 65/607; H04L 67/02; H04L 67/06; H04L 67/1097
  See application file for complete search history.

(56) References Cited

U.S. PATENT DOCUMENTS

| | | |
|---|---|---|
| 6,330,572 B1 | 12/2001 | Sitka |
| 6,507,849 B1 | 1/2003 | Choudhary |
| 7,398,464 B1 | 7/2008 | Wei |
| 7,693,962 B2 | 4/2010 | Serlet et al. |
| 8,407,190 B2 | 3/2013 | Prahlad et al. |
| 8,639,669 B1 | 1/2014 | Douglis et al. |
| 8,650,166 B1 | 2/2014 | Cook et al. |
| 8,856,216 B2 | 10/2014 | Kuruvilla |
| 9,239,855 B2 | 1/2016 | Thakkar |
| 2004/0205083 A1 | 10/2004 | Andrews |
| 2005/0102371 A1 | 5/2005 | Aksu |
| 2006/0271596 A1 | 11/2006 | Sabsevitz et al. |
| 2007/0220014 A1 | 9/2007 | Emling et al. |
| 2008/0195772 A1 | 8/2008 | Ferlitsch |
| 2008/0243960 A1 | 10/2008 | Bergauer et al. |
| 2009/0216907 A1 | 8/2009 | Eastman et al. |
| 2009/0327729 A1 | 12/2009 | Rhodes et al. |
| 2010/0037206 A1 | 2/2010 | Larimore |
| 2010/0125591 A1 | 5/2010 | Ben Tsvi et al. |
| 2010/0153407 A1 | 6/2010 | Krislov |
| 2010/0318632 A1* | 12/2010 | Yoo ........................ H04L 65/605 709/219 |
| 2011/0185292 A1 | 7/2011 | Chawla et al. |
| 2012/0059793 A1 | 3/2012 | Shlomai et al. |
| 2012/0089650 A1 | 4/2012 | Gibbs |
| 2012/0254339 A1 | 10/2012 | Holmes |
| 2012/0290576 A1 | 11/2012 | Amorim |
| 2013/0138775 A1 | 5/2013 | Shah |
| 2014/0156616 A1 | 6/2014 | Thakkar |

OTHER PUBLICATIONS

U.S. Office Action dated Nov. 19, 2014 for U.S. Appl. No. 13/779,390.
U.S. Office Action dated Dec. 18, 2014 for U.S. Appl. No. 13/779,303.
Non-final Office Action U.S. Appl. No. 14/944,919 dated Dec. 16, 2016.
Office Action U.S. Appl. No. 13/779,390 dated Jan. 22, 2016.
Office Action U.S. Appl. No. 13/779,303 dated May 6, 2016.
Office Action U.S. Appl. No. 13/779,390 dated Aug. 30, 2016.
Office Action U.S. Appl. No. 13/779,303 dated Nov. 25, 2015.
Non-final Office Action U.S. Appl. No. 14/944,919 dated May 11, 2017.
Notice of Allowance U.S. Appl. No. 13/779,303 dated Jan. 17, 2017.
Final Office Action U.S. Appl. No. 14/944,919 dated Sep. 18, 2017.
Notice of Allowance U.S. Appl. No. 14/944,919 dated Feb. 15, 2018.
Non-Final Office Action dated Oct. 2, 2019 in related U.S. Appl. No. 15/405,782, 47 pages.

* cited by examiner

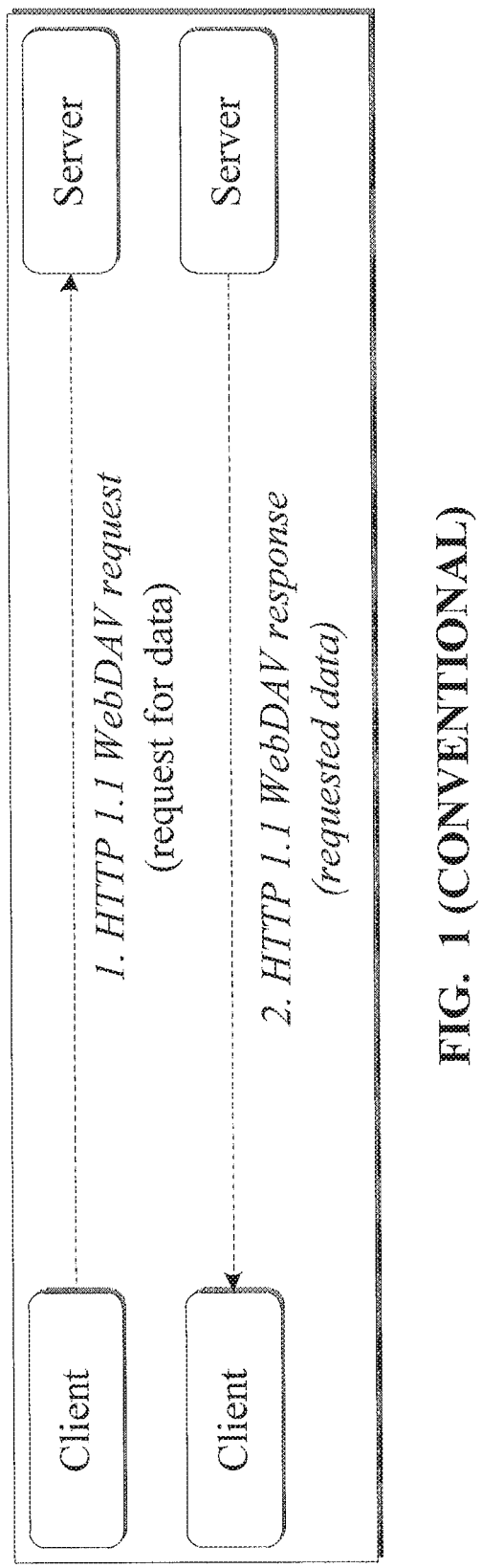
FIG. 1 (CONVENTIONAL)

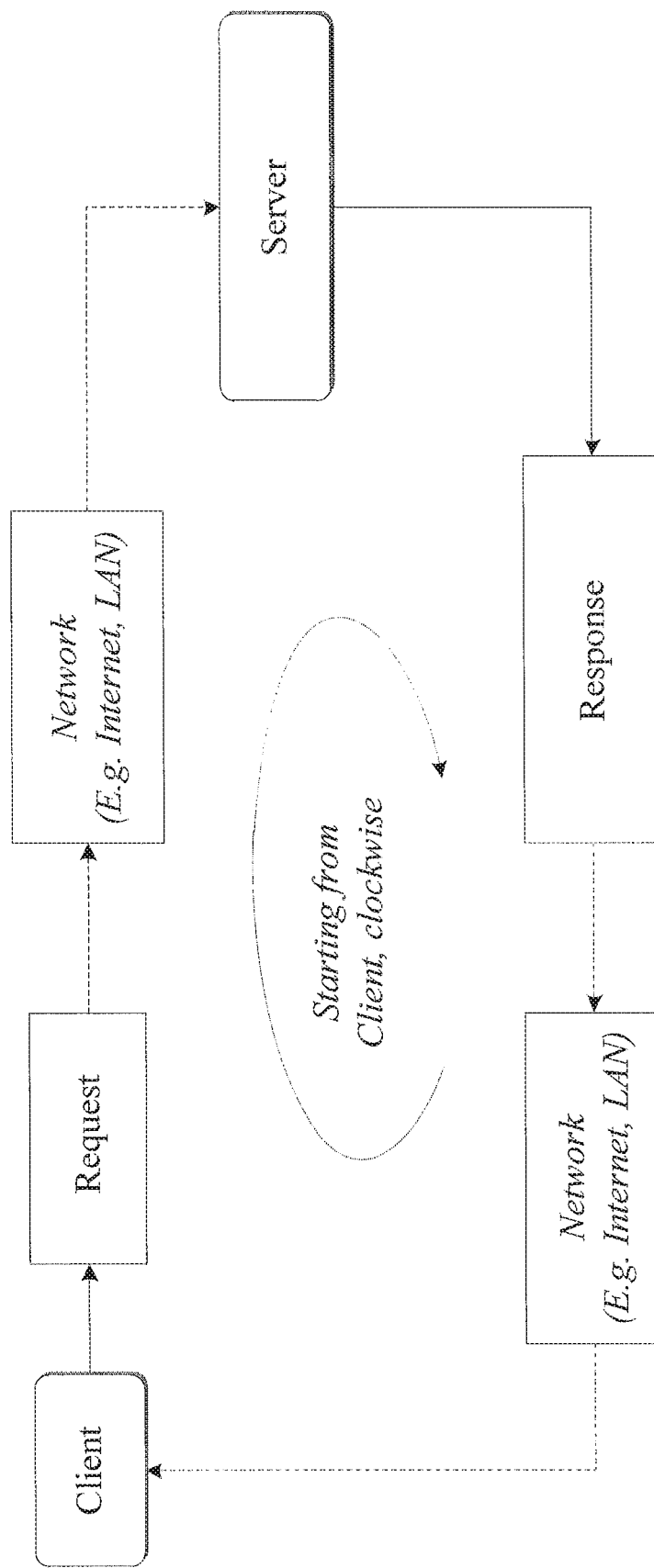
FIG. 2 (CONVENTIONAL)

METHOD AND SYSTEM OF RETRIEVING DATA IN A DATA FILE

CROSS-REFERENCE TO RELATED APPLICATIONS

This application is a Continuation of U.S. application Ser. No. 14/944,919, filed Nov. 18, 2015, which is a Continuation of U.S. application Ser. No. 13/779,275, filed Feb. 27, 2013, now U.S. Pat. No. 9,239,855, which claims the benefit of priority to U.S. Provisional Application No. 61/733,228 filed, Dec. 4, 2012, the entire contents of each of these applications are incorporated herein by reference in their entirety.

BACKGROUND OF THE INVENTION

Field of the Invention

The present invention pertains to data storage and retrieval, and in particular to a method and system of storing a client provided data file along with an associated data file virtualization policy for retrieval; and a method and system for the retrieval of data from the client provided data file.

Discussion of Related Art

Interchange of computer data using a client program and a server program is a well-known technology. A client program communicates with a server program using a communication protocol over a network, for example a LAN, WAN or the Internet. Examples of a communication protocol are TCP, UDP, HTTP, HTTPS, socket-based communication, HTTP 1.1 WebDAV. A client program sends a request for data to a server program. Based on that request the server program sends data to the client program in response to the request.

The client program and the server program may be running on the same computer or on separate computers. For example, a client program may be running on a client computer while a server program may be running a server computer. The server computer may be a computer system having one or more processors. However, the client program and the server program may also be running on the same computer system. In addition, a client program may be running on one or more computers. Similarly, a server program may be running on one or more computers. The computers running client programs and server programs are connected to each other in some form over the network.

Server and client programs follow some type of communication protocol to be able to understand each other. One such method is when a client side asks a server side about its capabilities. The server side then responds to the client side with a list of services it offers. The client may utilize those services to fulfill its goals by making additional requests to the server.

A client program includes a set of one or more computer programs. A server program includes a set of one or more computer programs.

The HTTP protocol is popular and a well-known standard over a computer network, for example LAN, WAN and the Internet or the World Wide Web (WWW). A current HTTP protocol version is HTTP 1.1 and is described in the Internet Engineering Task Force Specification IETF RFC 2616. An extension to the HTTP 1.1 protocol is HTTP 1.1 WebDAV. This protocol is described in IETF RFC 4918.

The HTTP 1.1 WebDAV protocol in its simplest form allows a computer to read from and write to web resources on a remote storage device using the WWW. A web resource can be a file or a one or more files. The protocol also supports the equivalent of hierarchical folder listings, file and folder metadata reporting, file and folder deleting and such features that existing Portable Operating System Interface (POSIX)-based file systems offer over the WWW, using this protocol. In addition, the protocol also supports file versioning over the WWW. The protocol allows for client programs to connect to remote storage solutions over the WWW and provision data at the remote location as if it were a network mounted POSIX file system.

For example, the HTTP protocol supports the OPTIONS request. It allows the server to provide a list of WebDAV commands that it supports and how the commands are supported. The WebDAV protocol requires the implementation of some requests. The implementation of other or additional WebDAV requests is optional. The PROPFIND request in WebDAV is used to retrieve properties and metadata from a resource. It is equivalent to getting properties and metadata about a file and getting a hierarchical directory or folder list. The MKCOL request in WebDAV is used to create collections, for example a collection could be a directory or folder. The GET request in WebDAV is used to retrieve a complete or partial resource, for example a file, from a remote location on the WWW. The PUT request in WebDAV is used to store a complete or partial resource, for example a file, from a remote location on the WWW. The COPY request in WebDAV duplicates a resource, for example a file. Details regarding the various requests that can be implemented in WebDAV can be found in the IETF RFC 4918 specification.

On a POSIX-based file system, there are various techniques and methods available for reading and writing files. One of these methods is synchronous or asynchronous unbuffered direct I/O.

Synchronous I/O implies that if a program issues a POSIX request to read or write, the control is returned to the program once the request is completed successfully or unsuccessfully and not before that. Asynchronous I/O implies that as soon as a program issues a POSIX request to read or write, the control is returned to the program. The actual read or write operation is completed at a later time and at that time the program that originally issued the write operation request is alerted regarding the completion status of the write operation.

Unbuffered Direct I/O implies that if a program issues a POSIX request to read or write, the operating systems does not do anything besides reading the data from storage into memory or writing the data from memory to storage. It does not perform caching of any sort.

Synchronous or asynchronous unbuffered direct I/O has constraints imposed by file system implementations. Some file systems permit a single I/O request of this type to be no larger than a certain number of bytes. For example, in certain versions of the Microsoft® Windows® operating system, a single direct I/O read request can be no larger than approximately 64 Megabytes. A read or write operation operates on a file starting from a specific offset and is of a specific size in bytes. Most file systems require that a single I/O request of this type be made starting at an offset and of a size that are an integer multiple of the storage device block size. For example, a storage device block size may be 512 bytes or 4096 bytes. Most operating systems also require that the computer memory allocated for such an operation begin and end at an operating system memory page boundary, for example, begin and end at operating system memory page boundary of 4096 bytes.

Popular WebDAV implementations generally utilize some form of buffered I/O. These implementations also utilize published or invented caching techniques to further improve performance. Caching methods are intended to improve aggregate performance based on pattern of access.

BRIEF SUMMARY OF THE INVENTION

An aspect of the present invention is to provide a method, implemented by a computer system, for storing data files. The method includes receiving, by the computer system, a first data file and a first data file virtualization policy; associating, by the computer system, the first data file with the first data file virtualization policy; and storing, by the computer system, the first data file and the first data file virtualization policy on a storage device in communication with the computer system.

Another aspect of the present invention is to provide a method, implemented by a computer system, for retrieving at least a portion of a first data file stored in a storage device in communication with the computer system. The method includes receiving, by the computer system from a client computer system in communication with the computer system, a request for the at least a portion of the first data file, the request including a start of the at least a portion of the first data file and a size of the at least a portion of the first data file; computing, by the computer system, a data offset that is aligned to an integer multiple of a block size of the storage device and nearest to the start of the at least a portion of the first data file; and computing, by the computer system, a byte-range that is an integer multiple of the block size of the storage device, the byte-range being greater than and encompasses the size of the at least a portion of the first data file. The method further includes reading, by the computer system, data within the byte-range and transferring the data within the byte-range starting at the data offset into memory of the computer system; and transmitting, by the computer system to the client computer system, the at least a portion of the first data file from the memory starting at an offset relative to the data offset that is aligned to an integer multiple of the block size of the storage device.

A further aspect of the present invention is to provide a system for storing data files. The system includes a computer system configured to: receive a first data file and a first data file virtualization policy; associate the first data file with the first data file virtualization policy; and store the first data file and the first data file virtualization policy on a storage device in communication with the computer system.

Another aspect of the present invention is to provide a system for retrieving at least a portion of a first data file stored in a storage device in communication with a computer system. The computer system is configured to: receive from a client computer system in communication with the computer system, a request for the at least a portion of the first data file, the request including a start of the at least a portion of the first data file and a size of the at least a portion of the first data file; compute a data offset that is aligned to an integer multiple of a block size of the storage device and nearest to the start of the at least a portion of the first data file; and compute a byte-range that is an integer multiple of the block size of the storage device, the byte-range being greater than and encompasses the size of the at least a portion of the first data file. The computer system is further configured to read data within the byte-range and transferring the data within the byte-range starting at the data offset into memory of the computer system; and transmit to a client computer system the at least a portion of the first data file from the memory starting at an offset relative to the data offset that is aligned to an integer multiple of the block size of the storage device.

Another aspect of the present invention is to provide a method, implemented by a client computer system, of requesting information from a server computer system. The method includes sending, by the client computer system to the server computer system, a request for policy capability of the server computer system for a data type; receiving, by the client computer system from the server computer system, a response to the request including a list of derived data types that are supported by the server computer system; generating, by the client computer system, a policy using the list of derived data types; and sending, by the client computer system to the server computer system, a first data file and a first data file virtualization policy for storage.

Another aspect of the present invention is to provide a system having a client computer system. The client computer system is configured to send to a server computer system in communication with the client computer system a request for policy capability of the server computer system for a data type; receive a response to the request including a list of derived data types that are supported by the server computer system; generate a policy using the list of derived data types; and send a first data file and a first data file virtualization policy for storage.

A further aspect of the present invention is to provide a method for retrieving at least a portion of a second derived virtual data file, the second derived virtual data file being derived from a first data file based on a first data file virtualization policy, the method being implemented by a computer system, the first data file being stored in a storage device in communication with the computer system. The method includes receiving, by the computer system from a client computer system in communication with the computer system, a request for the at least a portion of the second derived virtual data file, the request including a virtual offset of the at least a portion of the second derived virtual data file and a size of the at least a portion of the second derived virtual data file; computing, by the computer system, a data offset and a size of at least a portion of the first data file to derive the requested at least a portion of the second derived virtual data file; reading, by the computer system, data from the first data file based on the computed data offset and size of the at least a portion of the first data file; generating, by the computer system, the requested at least a portion of the second derived data file using information in the first data file virtualization policy and the read data from the first data file; and transmitting, by the computer system to the client computer system, the requested at least a portion of the second derived virtual data file.

Another aspect of the present invention is to provide a system for retrieving at least a portion of a second derived data file, the second derived virtual data file being derived from a first data file based on a first data file virtualization policy, the first data file being stored in a storage device in communication with a computer system. The computer system is configured to: receive from a client computer system in communication with the computer system, a request for the at least a portion of the second derived virtual data file, the request including a virtual offset of the at least a portion of the second derived virtual data file and a size of the at least a portion of the second derived virtual data file; compute a data offset and a size of at least a portion of the first data file to derive the requested at least a portion of the second derived virtual data file; read data from the first data file based on the computed data offset and size of the at least a portion of the first data file; generate the requested at least a portion of the second derived data file using information in the first data file virtualization policy and the read data from the first data file; and transmit to the client computer system the requested at least a portion of the second derived virtual data file.

Although the various steps of the method are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures.

In one embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 1 depicts a client program making a request to a server program, and a server program responding to the client program with a response to that request over a computer network using the HTTP 1.1 WebDAV specification;

FIG. 2 depicts a general client-server application workflow;

DETAILED DESCRIPTION OF EMBODIMENTS OF THE INVENTION

Figure 3:
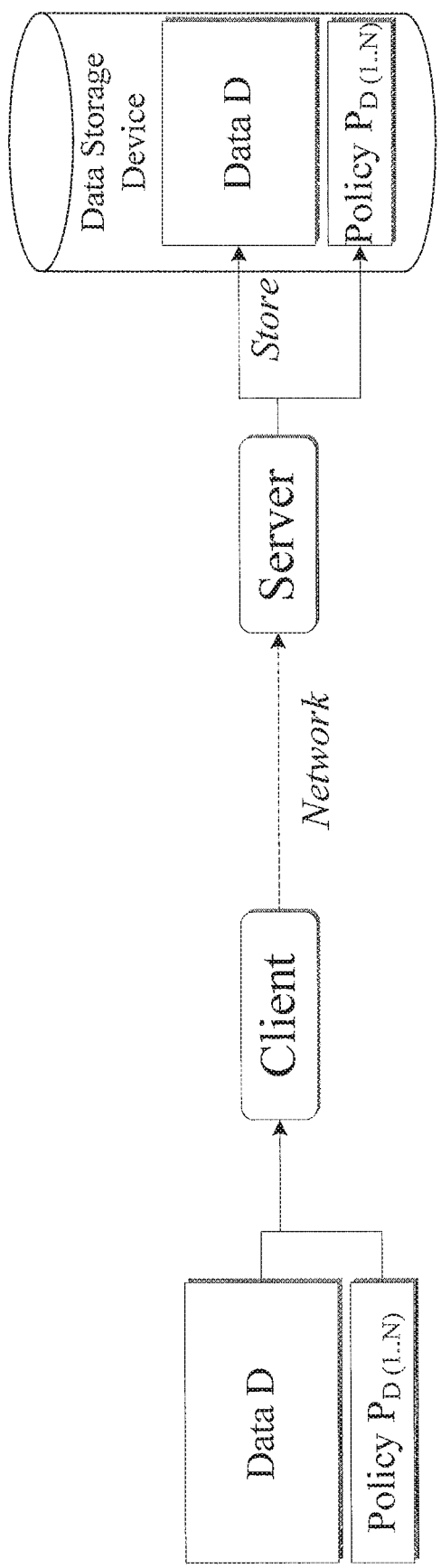
FIG. 3 depicts the workflow of a client program reading a data file and a data file virtualization policy, sending the data file to a server program over a network such as a LAN or the Internet, and the server storing the data file and the data file virtualization policy on to a storage device, according to an embodiment of the present invention.

A data file is defined as one or more bytes that exist in computer memory or on a computer storage device, such as a hard disk or a clustered storage device. A data file can be exposed to a computer program via a well-known interface, for example, an Object Storage Solution interface, or a POSIX file-system interface. One or more data files are referred herein as a collection of data files. The symbol D is used herein to indicate the collection of data files.

A data file that is physically stored on a storage device is referred to as a first data file. A data file that is virtually presented to a consumer as if it were stored on a storage device but is not actually stored on a storage device, and is derived from the first data file, is referred to herein as a second virtual derived data file, and also referred to as a second derived data file, or a second derived virtual data file, or a second virtual data file, or a derived data file, or a virtual data file.

A data type describes the byte-layout and type of data stored in a data file. For example, Point Cloud LiDAR data is stored in data files of a well-known file format named LAS. Therefore, a Collection of LAS Data Files containing Point Cloud LiDAR data are of data type Point Cloud LiDAR LAS. For example, Wide-Area Motion Imagery (WAMI) data is stored in data files of a well-known file format named GeoJP2. Therefore, a Collection of GeoJP2 Data Files containing WAMI data are of data type WAMI GeoJP2. For example, Live-Action Motion Picture frames captured at 24 or 48 frames per second is stored in data files of a well-known file format named OpenEXR. Therefore a Collection of OpenEXR Data Files, each data file including one live-action motion picture frame are of data type Live-Action Motion Picture OpenEXR. The symbol $T_D$ refers to the data type of a collection of data files D.

FIG. 1 depicts a client program making a conventional HTTP 1.1 WebDAV request to a server program and the server responding with a HTTP 1.1 WebDAV response comprising in-part of the data requested by the client program. With reference to an embodiment of the present invention, a client program can also be a computer program that requests a server program to store data. In that case, a server program is a computer program that fulfills the request to store data from a client program and sends an appropriate response to the client program. A client program can also be a computer program that requests for data and consumes it for a purpose. In that case, a server program is a computer program that provisions that data to the client program.

The various methods described herein depict multiple workflows. A workflow is a diagram that depicts primary phases of an operation, or a sequence of connected steps in an operation. An example of a conventional circular workflow is depicted in FIG. 2. In this example, a client program generates a request for a server program and sends it to the server program over a computer network. The server program receives the request, processes the request and generates a response. The response is sent by the server program back to the client program over a computer network. The client program receives the response. The cycle continues.

FIG. 3 depicts the workflow of a client program reading a data file and a data file virtualization policy, sending the data file to a server program over a network such as a LAN or the Internet, and the server storing the data file and the data file virtualization policy on to a storage device, according to an embodiment of the present invention.

In one embodiment, for example, a client program entrusts a server program with a first data file D that is of a known data type $T_D$. The goal for the client is to access the first data file D at a future time. A client program may also have to access additional data of same or different data types that are derived from D at a future time. If the server program does not provide for such derived data or provide the ability to create such derived data, the client program would have to look for alternative services. If such services are not available, the client program has to generate the derived data by itself. In the following paragraphs, a method for storing and retrieving data files on a storage device is described.

In one embodiment, the method allows for defining a data file virtualization policy that provides a client program with the ability to send the client program's intent to access the data stored in a first data file, as well as an intent of the client program to access data files of other data types that are derived from the first data file.

A data file virtualization policy is defined as the intent, by a client program, of accessing a first data file D, as well as derived data files $D_1, D_2 \ldots D_N$. One or more derived data files $D_1, D_2 \ldots D_N$ are derived from the first data file D, and are virtual. The term virtual implies that one or more data files $D_{1 \ldots N}$ do not physically exist on a storage device. The term virtual further implies that a directory listing of data files $D_{1 \ldots N}$ is available to the client program. The client program believes that data files exist on the server side storage device. The term virtual further implies that a derived data file $D_J$ (where, $1 \leq J \leq N$) is generated by the server program by reading the first data file D wholly or partially, dynamically, on-demand, when a client requests for that specific derived data file. A data file virtualization policy is denoted herein as $P_D$ or $P_{D(1 \ldots N)}$. A client program sends a first data file D (i.e., one or more first data files D) to a server program accompanied by a virtualization policy $P_D$ that corresponds to each first data file D in the one or more data files D. The one or more data files D are of the same data type $T_D$.

When a server program receives one or more first data files and $P_D$, from a client program, the server program takes the one or more first data files and $P_D$ and stores it on a storage device. Using either a database or a known structure or protocol, it associates the one or more first data files with $P_D$. For example, a known protocol would be for the server to save the one or more first data files and $P_D$ into the same server-side storage folder and append a server-generated UUID for each file in the one or more first data files, into $P_D$. In this example, a first data file D would be one of the files in the one or more first data files.

FIG. 3 depicts a client program sending to a server program, a first data file D and an associated first data file virtualization policy $P_{D(1 \ldots N)}$ using a computer network, according to an embodiment of the present invention. The diagram further depicts the server receiving data file D and data file virtualization policy $P_{D(1 \ldots N)}$ and saving D and $P_{D(1 \ldots N)}$ to a storage device. D can be one data file of data type $T_D$ or it can be more than one data files of the same data type $T_D$.

A client program does not know what derived data types are supported by a server program for a data file of data type $T_D$. Therefore, a client program may request a server program to send back a list of supported derived data types. The client program may also request a list of supported parameters for each supported derived data type. The parameters allow a client program to control the output of the derived data that will be subsequently generated on-demand by the server program. Once the list of supported parameters is known, a client program can announce its intent to request for all supported derived data types or only a subset of supported derived data types, at a future time.

Figure 4:
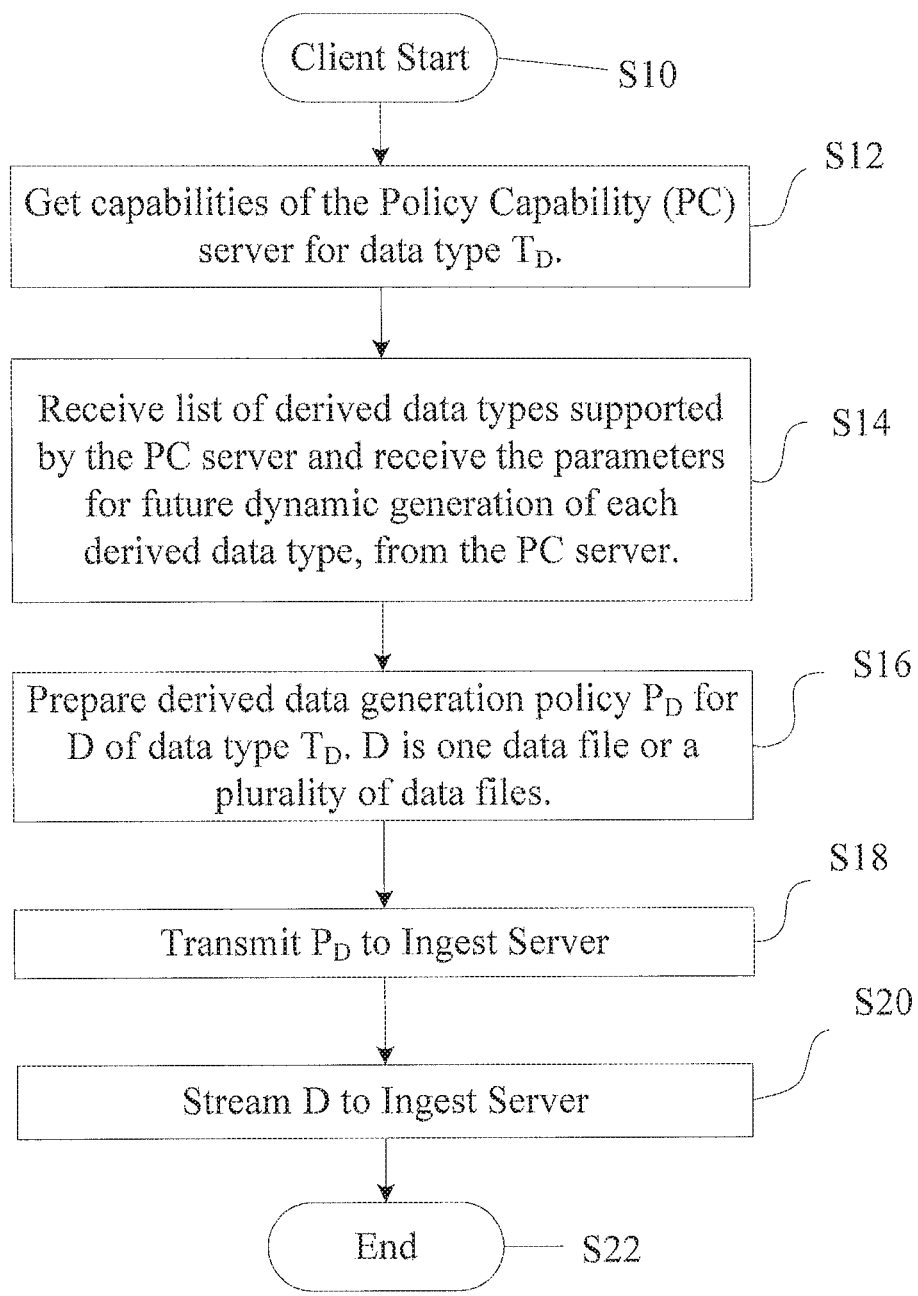
FIG. 4 depicts a flowchart showing how a client program uploads a data file and a data file virtualization policy to a server program, according to an embodiment of the present invention.

FIG. 4 depicts a flowchart showing how a client program uploads a data file and a data file virtualization policy to a server program, according to an embodiment of the present invention. As shown in FIG. 4, a client program starts at S10. At S12, the client program sends a request to a server over a computer network using a well-established protocol, for example RESTful HTTP or RESTful HTTPS. The request includes requesting server program's Policy Capabilities (PC) for a data type $T_D$, as provided by a client. At S14, the client program receives a response from the server program. The response includes a list of derived data types that are supported by the server program. For each derived data type, the server program may also provide a list of parameters used to control the derived data file content that would eventually be generated should the client program later ask for a derived data file. In one embodiment, a client program may choose to save this response locally to avoid making such a request again. At S16, the client program prepares a policy $P_D$, revealing the client program's intent to access one or more derived data files $D_{1 \ldots N}$ of a one or more data types, at a future time. At S18, the client program sends or transmits $P_D$ to a server program over the computer network using a well-established protocol, for example RESTful HTTP or HTTPS. At S20, the client program sends a data stream of the data file D (i.e., streams data D) to the server program that was just sent $P_D$. The method ends at S22. The client program may also choose to send $P_D$ and D in the same request.

Figure 5:
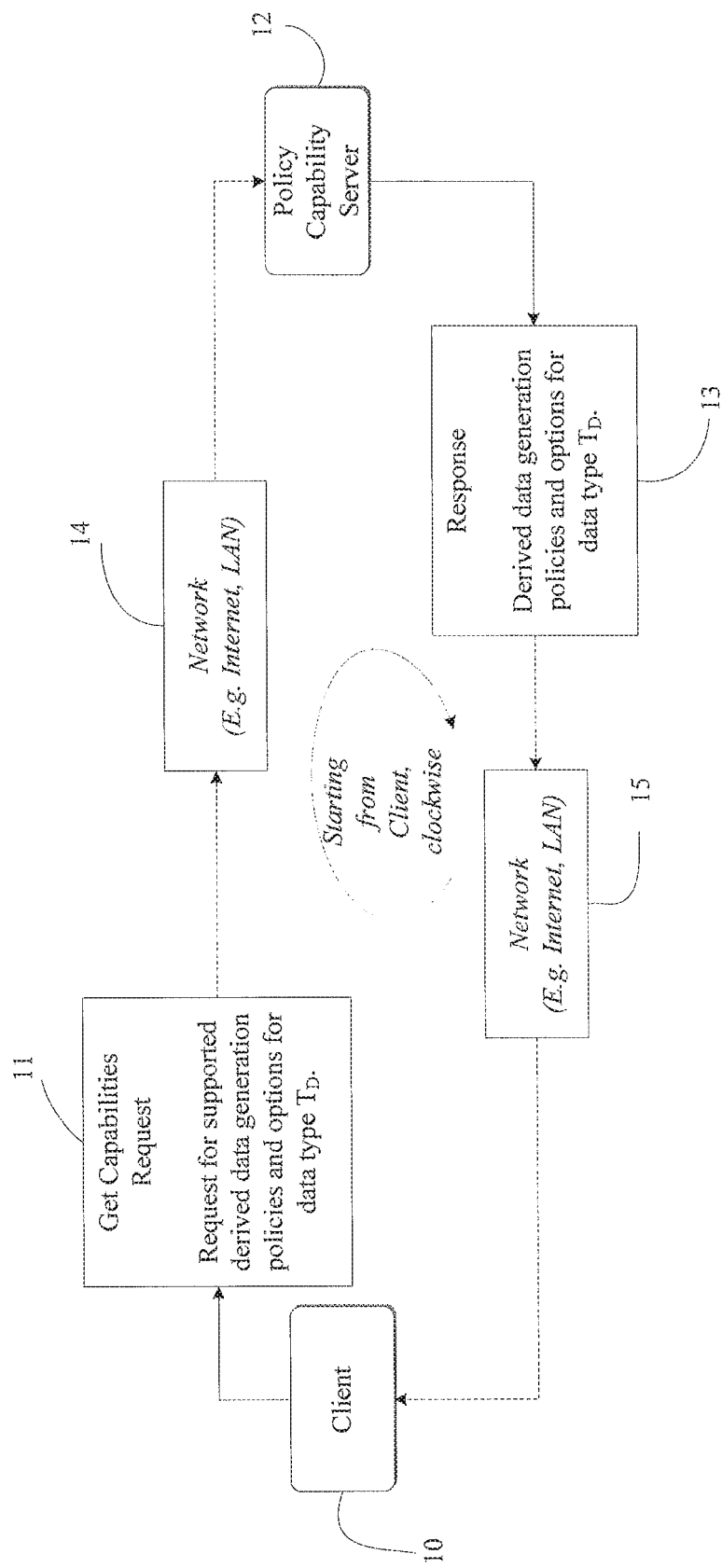
FIG. 5 depicts a workflow of a client requesting for a list of supported virtualization data types for a given data type from a server, according to an embodiment of the present invention.

FIG. 5 is a workflow diagram of the part of the embodiment of the invention where a client program 10 makes a request 11 to a server program 12 over a computer network such as a LAN or the Internet 14, using a well-established, mutually understood protocol such as RESTful HTTP or HTTPS, according to an embodiment of the present invention. The request 11 includes asking for the capabilities of a Policy Capability (PC) server program 12 for a specific data type $T_D$. The server program 12 receives this request 11 and prepares a response 13. The response 13 comprises a list of derived data virtualization policies for $T_D$, and parameters for each derived data type. The server program 12 sends the response 13 to the client program 10 over a computer network 15 such as a LAN or the Internet, using a well-established, mutually understood protocol such as RESTful HTTP or HTTPS. Network 15 can be the same as or different from network 14.

Figure 6:
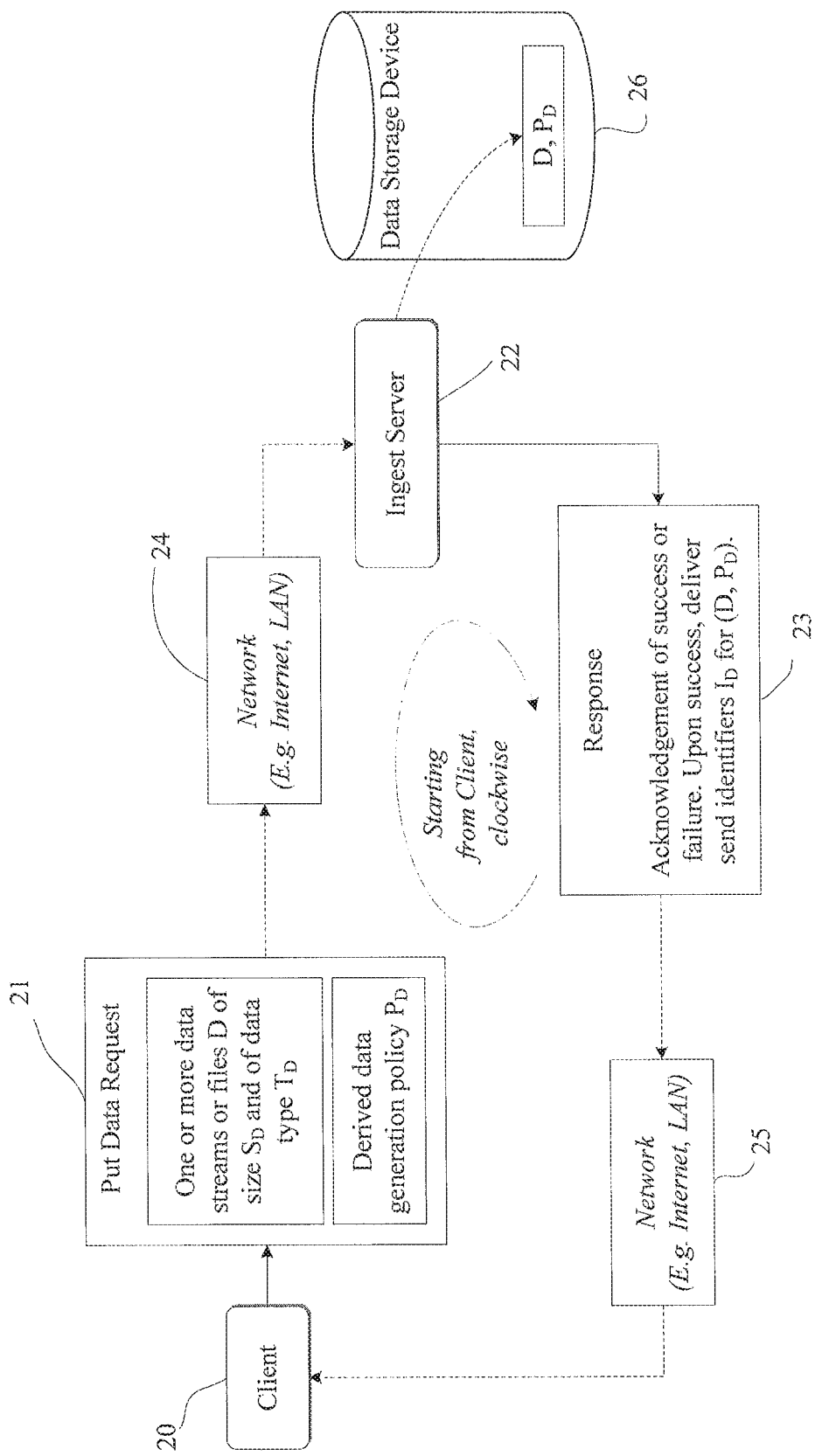
FIG. 6 depicts the workflow of a client uploading a first data file and a first data file virtualization policy to a server, according to an embodiment of the present invention.

FIG. 6 is a workflow diagram of the part of the embodiment of the invention where a client program 20 transfers a data file D and a data file virtualization policy $P_D$ to a server program 22 over a computer network such as a LAN or the Internet 24, using a well-established, mutually understood protocol such as RESTful HTTP or HTTPS, according to an embodiment of the present invention. As shown in FIG. 6, the client program 20 sends a request 21 to the server 22. In one embodiment, the client program 20 sends request 21 by transferring the $P_D$, and one or more data files, such that $P_D$ is associated with each data file D to server 22. If D is one data file, there is a one-to-one relationship between $P_D$ and D, where $P_D$ is the data file virtualization policy for D. If D comprises a plurality of data files, there is a one-to-many relationship between $P_D$ and D, where $P_D$ is the data file virtualization policy for each data file D of the plurality of data files. The server program specializes in the ingestion of D and $P_D$. The ingest server program 22 receives the request 21 and stores D and $P_D$. The server 22 transfers D and $P_D$ to a storage device 26. For each data file D in the one or more data files, the ingest server program 22 prepares a unique identifier, for example a UUID, or a URI, as part of the response to the client program 20, to identify a data file D and its associated policy $P_D$. The identifier is referred to herein as ID. The ingest server program 22 transmits that information as part of a response 23 to the client program 20 using over a computer network 25 such as a LAN or the Internet, using a well-established, mutually understood protocol such as RESTful HTTP or HTTPS. The client receives this response and the cycle of data transfer continues. The network 25 can be the same as or different from network 24.

Figure 7:
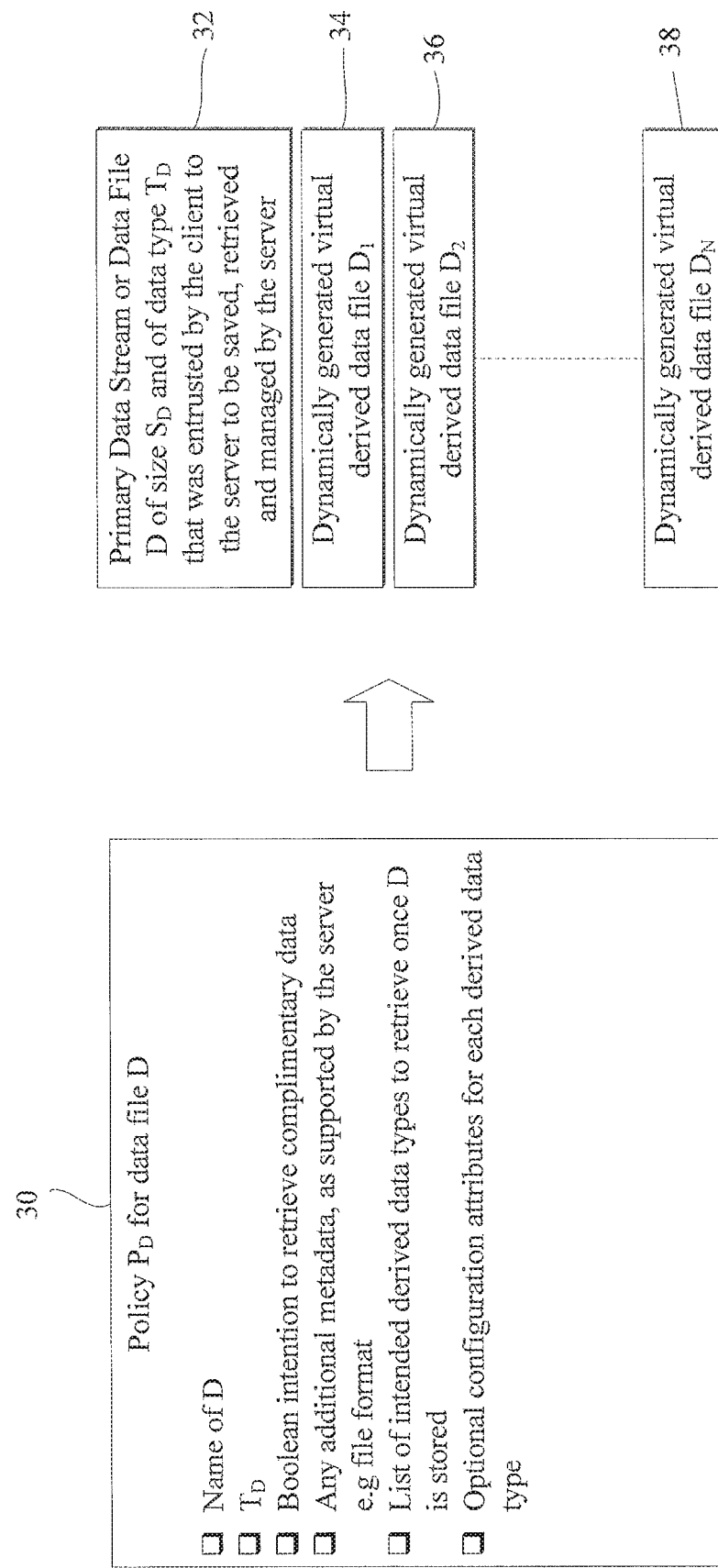
FIG. 7 depicts a first data file virtualization policy $P_D$ for a first data file D that expresses a client program's intent to access a sequence of N virtual derived data files $D_1$ to $D_N$, where N>0, according to an embodiment of the present invention.

FIG. 7 depicts a first data file virtualization policy $P_D$ for a first data file D that expresses a client program's intent to access a sequence of N virtual derived data files $D_1$ to $D_N$, where N>0, according to an embodiment of the present invention. A data file virtualization policy is represented by the symbol $P_D$. One $P_D$ applies to one first data file D. One $P_D$ can also apply to a one or more first data files. A $P_D$ includes a set of hierarchical properties, and can be represented in a standard format, for example XML, JSON, or NetCDF for transmission over a computer network.

As shown in FIG. 7 a policy $P_D$ 30 for a first data file D may include at least the following items:
1. The name of the first data file D
2. The data type $T_D$ of the first data file D
3. A Boolean flag set to either True or False, where True indicates intent of client program 20 to request for derived data
4. A list of derived data types that the client program 20 intends to retrieve, in addition to data file D
5. For each derived data type, the client program 20 has a list of parameters that the server program 22 supports for configuring and controlling the content for a derived data file. This list can be obtained by the client via a prior request to a PC server program 12. The client 20 provides a list of parameters or configuration attributes to control the content of the derived data type. As an example, such a list of parameters may include other data files that may also contribute to the generation of the associated derived data file. As another example, such a list of parameters may include on-off flags, optional or required values that contribute to the generation of the associated derived data file.

As shown in FIG. 7, a policy $P_D$ for a first data file D 30 is interpreted by a server program 22 that disseminates data files to any interested and permitted client program 20. The server program 22 has a policy $P_D$ for a first data file D. The policy $P_D$ indicates the intent of a client program 20 to access derived data files $D_{1 \ldots N}$. The server program 22 shows to the client program 20, a list including the first data file D, its size $S_D$, and additional information about the file D. If $P_D$ indicates the intent for additional derived data files $D_{1 \ldots N}$, then the server program 22 also shows additional N file entries. Each data file entry is virtual starting from file $D_1, D_2$, up to $D_N$. This means, the data files $D_1, D_2$, up to $D_N$ do not exist on the storage device 26. When asked for, they are generated on-demand, dynamically. The Primary Data Stream from Data File D of size $S_D$ and of data type $T_D$ is shown by the server program 22 in the directory listing 32 generated using information about D and information provided in $P_D$ 30. If $P_D$ also indicates the client program's 20 intent to use derived virtual data files $D_{1 \ldots N}$, the server program 22 generates N additional directory entries for dynamically generated virtual derived data file $D_1$ 34, dynamically generated virtual derived data file $D_2$ 36, up to and including dynamically generated virtual derived data file $D_N$ 38.

Figure 8:
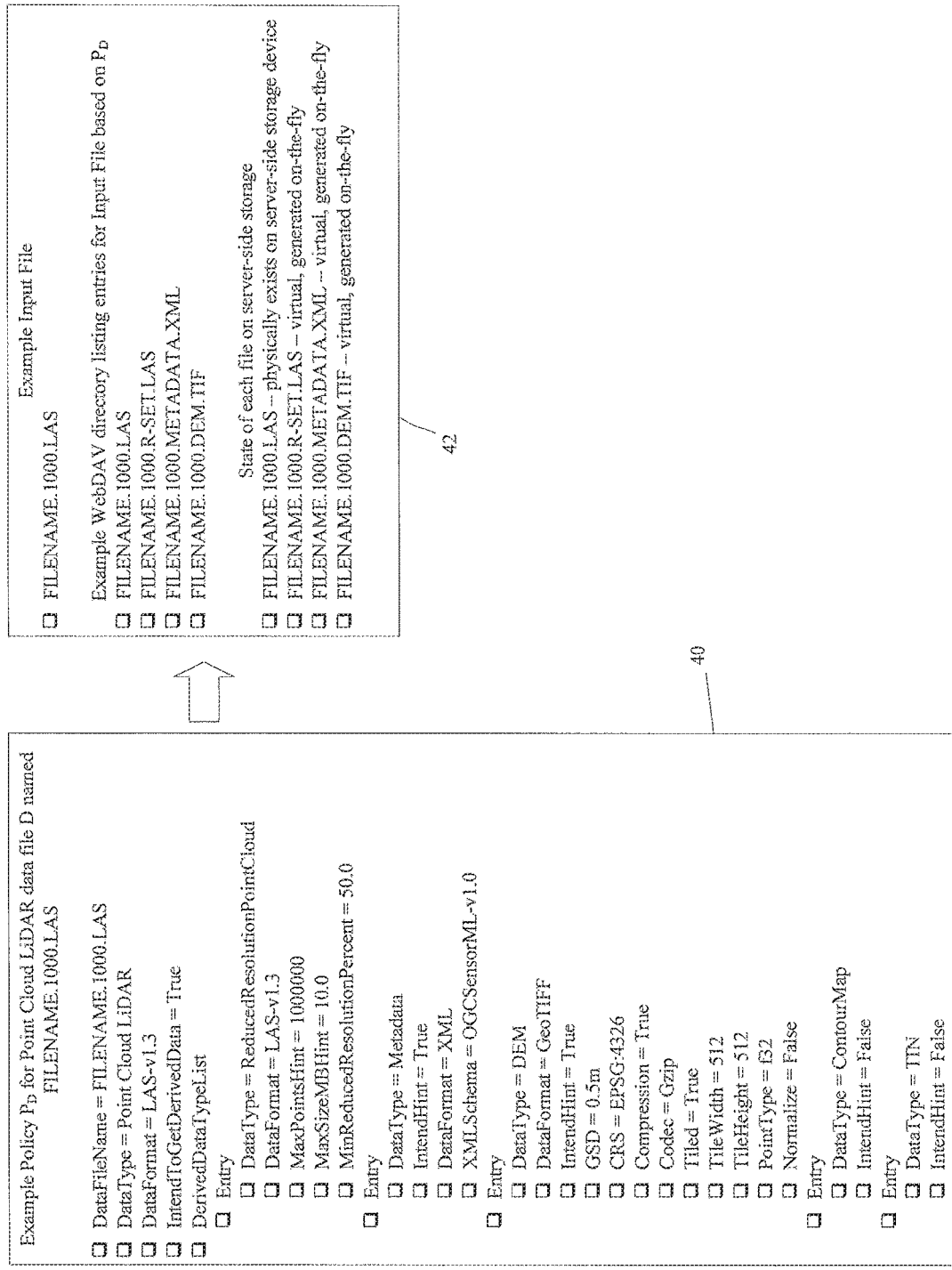
FIG. 8 depicts an example of a first data file virtualization policy for storing a first data file of data type Point Cloud LiDAR, and depicts how that policy results in the client eventually being able to access the first data file and a one or more virtual derived data files from the server, according to an embodiment of the present invention.

FIG. 8 depicts an example of a first data file virtualization policy for storing a first data file of data type Point Cloud LiDAR, and depicts how that policy results in the client eventually being able to access the first data file and a one or more virtual derived data files from the server, according to an embodiment of the present invention. FIG. 8 shows an example of a policy $P_D$ 40 applied to a data file D of data type $T_D$ of Point Cloud LiDAR LAS. $P_D$ applies to data file D, named FILENAME.1000.LAS. $P_D$ can be in any known format, for example XML or JSON. The policy specifies that it applies to data file D of name FILENAME.1000.LAS. It specifies that it is of data type Point Cloud LiDAR. It specifies that the format of the data file is LAS version 1.3. It specifies that the client intends to access additional derived virtual data types. It lists the first derived virtual data type to be a Reduced Resolution Point Cloud. A set of parameters may be provided to define how the Reduced Resolution Point Cloud is to be generated. Subsequent entries describe additional virtual derived data types that the client intends to access. In a subsequent HTTP 1.1 WebDAV PROPFIND request, the server program 22 shows to the client program 20, a directory listing 42 including the primary first data file D, which is FILENAME.1000.LAS. In addition, the server 22 also shows to the client program 20, an additional three virtual derived data files. These three data files are named FILENAME.1000.R-SET.LAS, FILENAME.1000.METADATA.XML, and FILENAME.1000.DEM.TIF. These files do not exist on the server-side storage device 26. If the client program 20 requests any one of the three derived data files using a subsequent HTTP GET, for example HTTP 1.1 GET and HTTP 1.1 WebDAV GET request, the server program 22 generates the files on-demand, dynamically, using data stored in FILENAME.1000.LAS and $P_D$ 50.

Figure 9:
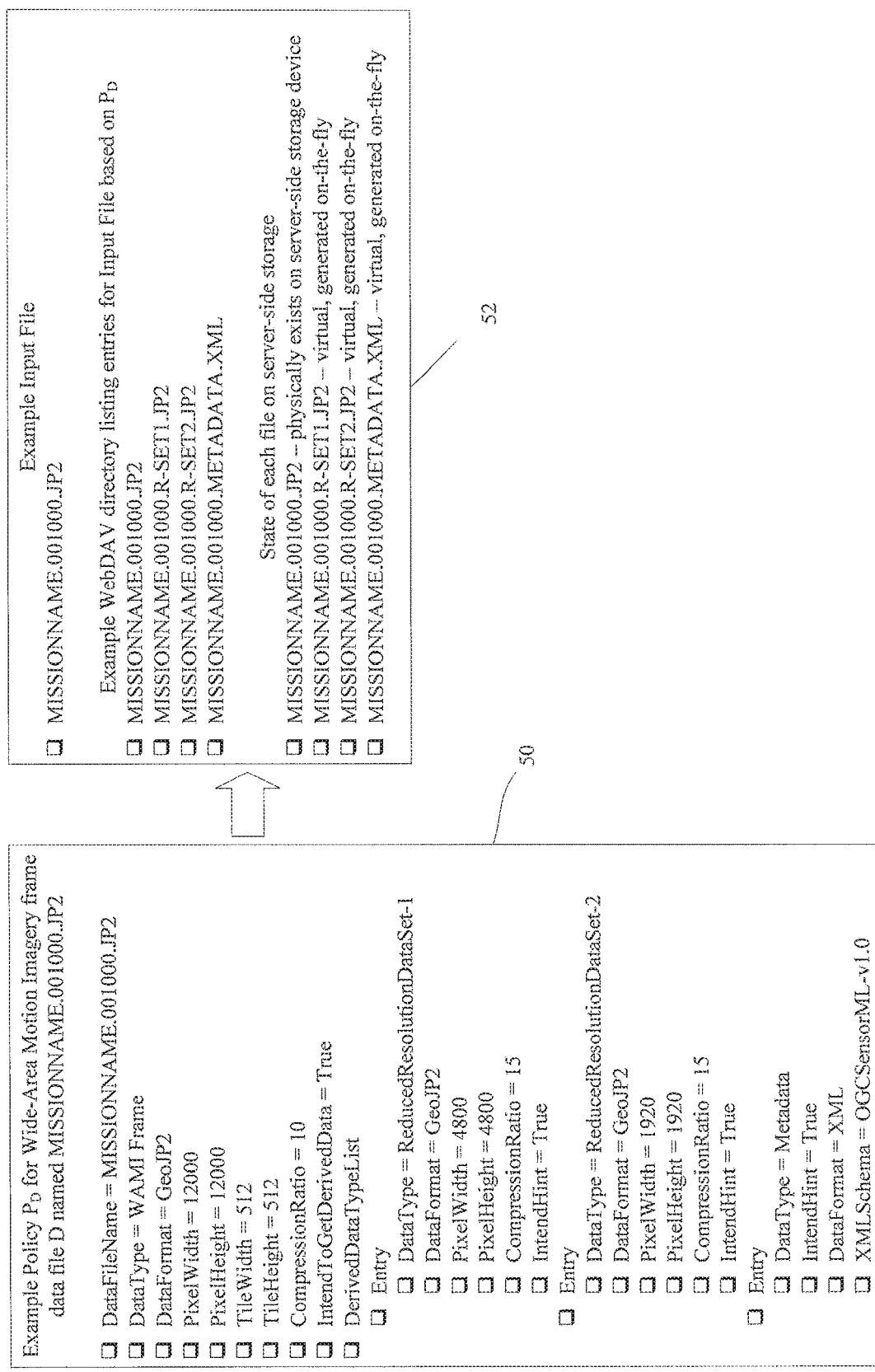
FIG. 9 depicts an example of a first data file virtualization policy for storing a first data file of data type JP2 from a Wide-Area Motion Imagery (WAMI) frame, and depicts how that policy results in the client eventually being able to access the first data file and a one or more virtual derived data files from the server, according to an embodiment of the present invention.

FIG. 9 depicts an example of a first data file virtualization policy for storing a first data file of data type WAMI Frame, and depicts how that policy results in the client eventually being able to access the first data file and a one or more virtual derived data files from the server, according to an embodiment of the present invention. FIG. 9 shows an example of a policy $P_D$ 50 applied to a data file D of data type $T_D$ of WAMI Frame. $P_D$ applies to data file D, named MISSIONNAME.001000.JP2. $P_D$ can be in any known format, for example XML or JSON. The policy specifies that it applies to data file D of name MISSIONNAME.001000.JP2. It specifies that it is of data type WAMI Frame. It specifies that the format of the data file is GeoJP2. It specifies the image and tile pixel sizes, and compression ratio. It specifies that the client intends to access additional derived virtual data types. It lists the first derived virtual data type to be a Reduced Resolution Dataset-1. A set of parameters may be provided to define how the Reduced Resolution Dataset is to be generated, for example for Reduced Resolution Dataset-1, the data format is to be GeoJP2, its pixel width and height are both to be 4800, its compression ratio is to be 15, with the client program expressing its intent to access the data. Subsequent entries describe additional virtual derived data types that the client intends to access. In a subsequent HTTP 1.1 WebDAV PROPFIND request, the server program 22 shows to the client program 20, a directory listing 52 including the primary first data file D, which is MISSIONNAME.001000.JP2. In addition, the server 22 also shows to the client program 20, an additional three virtual derived data files. These three data files are named MISSIONNAME.001000.R-SET1.JP2, MISSIONNAME. 001000.R-SET2.JP2, and MISSIONNAME. 001000.METADATA.XML. These files do not exist on the server-side storage device 26. If the client program 20 requests any one of the three derived data files using a subsequent HTTP GET request, the server program 22 generates the files on-demand, dynamically, using data stored in MISSIONNAME.001000.JP2 and $P_D$ 50.

An example of a RESTful HTTP GET request to obtain a list of PC for a $T_D$ of Point Cloud LiDAR LAS files is provided below, as described above with respect to FIG. 4, FIG. 5, and FIG. 8.
http://example.com/hcfs-pc-server?SERVICE=HiPERCIoudFS &VERSION=1.0.0& REQUEST=GetPolicyCapabilities&DataType=PC-LiDAR-LAS&FORMAT=text/xml An example of a RESTful HTTP POST request to obtain a list of PC for a $T_D$ of Point Cloud LiDAR LAS files is provided below, as described above with respect to FIG. 4, FIG. 5, and FIG. 8. The value of length is the number of bytes of subsequent data in the HTTP request.

```
POST /hcfs-pc-server HTTP/1.1
Host: example.com
Content-Type: text/xml; charset=utf-8
Content-Length: length
<?xml version="1.0" encoding="utf-8"?>
<hcfs:GetPolicyCapabilities xmlns:hcfs="http://www.example.com/hcfs"
service="HiPERCloudFS"
version="1.0.0" dataType="PC-LiDAR-LAS" format="text/xml"/>
```

Based on the prior example of an HTTP GET or POST request of GetPolicyCapabilities, an example of a response from the server program 22 is provided below. Such a response is dependent on the specification for communication between a client program 20 and the server program 22.

```
<?xml version="1.0" encoding="utf-8" ?>
<hcfs:PolicyCapabilities xmlns:hcfs="http://www.example.com/hcfs"
version="1.0.0">
   <hcfs:SupportedPolicy name="PC-LiDAR-LAS">
      <hcfs:Parameter name="Policy">
         <hcfs:Attribute name="derivedDataAccessIntent">
            <hcfs:AllowedValues>
               <hcfs:Value>True</hcfs:Value>
               <hcfs:Value>False</hcfs:Value>
            </hcfs:AllowedValues>
         </hcfs:Attribute>
         <hcfs:Attribute name="dataTypeName">
            <hcfs:AllowedValues>
               <hcfs:Value>Point Cloud LiDAR</hcfs:Value>
               <hcfs:Value>PC LiDAR</hcfs:Value>
               <hcfs:Value>LiDAR Point Cloud</hcfs:Value>
            </hcfs:AllowedValues>
         </hcfs:Attribute>
         <hcfs:Attribute name="fileCount" />
         <hcfs:Attribute name="format">
            <hcfs:AllowedValues>
               <hcfs:Value>application/x-las-10</hcfs:Value>
               <hcfs:Value>application/x-las-11</hcfs:Value>
               <hcfs:Value>application/x-las-12</hcfs:Value>
               <hcfs:Value>application/x-las-13</hcfs:Value>
            </hcfs:AllowedValues>
         </hcfs:Attribute>
         <hcfs:Parameter name="filename" />
      </hcfs:Parameter>
      <hcfs:DerivedDataTypes>
         <hcfs:DataType name="Metadata">
            <hcfs:Parameter name="DerivedData">
               <hcfs:Attribute name="dataTypeName">
                  <hcfs:AllowedValues>
                     <hcfs:Value>Metadata</hcfs:Value>
                  </hcfs:AllowedValues>
               </hcfs:Attribute>
               <hcfs:Attribute name="format">
                  <hcfs:AllowedValues>
                     <hcfs:Value>text/xml</hcfs:Value>
                     <hcfs:Value>application/json</hcfs:Value>
                  </hcfs:AllowedValues>
               </hcfs:Attribute>
               <hcfs:Attribute name="schemaHint">
                  <hcfs:AllowedValues>
                     <hcfs:Value>OGC SensorML v1.0.1</hcfs:Value>
                     <hcfs:Value>Something else</hcfs:Value>
                  </hcfs:AllowedValues>
               </hcfs:Attribute>
               <hcfs:Attribute name="derivedDataAccessIntent">
                  <hcfs:AllowedValues defaultValue="True">
                     <hcfs:Value>True</hcfs:Value>
                     <hcfs:Value>False</hcfs:Value>
                  </hcfs:AllowedValues>
               </hcfs:Attribute>
            </hcfs:Parameter>
         </hcfs:DataType>
         <hcfs:DataType name="RRD for Point Cloud LiDAR">
            <!-- information about this data type -->
```

```
      </hcfs:DataType>
      <hcfs:DataType name="DEM">
          <!-- information about this data type -->
      </hcfs:DataType>
    </hcfs:DeriyedDataTypes>
  </hcfs:SupportedPolicy>
</hcfs:PolicyCapabilities>
```

An example of a RESTful HTTP POST request to send $P_D$ to the data storage server program is provided below, as described above with respect to FIG. 4, FIG. 5, and FIG. 8. The service may return a policy identifier UUID to permit subsequent data file D uploads that are linked to this policy.

```
POST /hcfs-ingest-server HTTP/1.1
Host: example.com
Content-Type: text/xml; charset=utf-8
Content-Length: length
<?xml version="1.0" encoding="utf-8"?>
<hcfs:PutPolicy xmlns:hcfs="http://www.example.com/hcfs"
service="HiPERCloudFS" version="1.0.0"
dataType="PC-LiDAR-LAS" format="text/xml">
   <hcfs:Policy
              dataTypeName="Point Cloud LiDAR"
              format="application/x-las-13"
              fileCount="12"
              derivedDataAccessIntent="True">
     <hcfs:filename>filename.1000.las</hcfs:filename>
     <hcfs:filename>filename.1001.las</hcfs:filename>
     <hcfs:filename>filename.1002.las</hcfs:filename>
     <hcfs:filename>filename.1003.las</hcfs:filename>
     <hcfs:filename>filename.1004.las</hcfs:filename>
     <hcfs:filename>filename.1005.las</hcfs:filename>
     <hcfs:filename>filename.1006.las</hcfs:filename>
     <hcfs:filename>filename.1007.las</hcfs:filename>
     <hcfs:filename>filename.1008.las</hcfs:filename>
     <hcfs:filename>filename.1009.las</hcfs:filename>
     <hcfs:filename>filename.1010.las</hcfs:filename>
     <hcfs:filename>filename.1011.las</hcfs:filename>
     <hcfs:DerivedData
        dataTypeName="Metadata"
        format="text/xml"
        schema="http://someurl/path"
        schemaHint="OGC SensorML v1.0.1"
        derivedDataAccessIntent="True"/>
     <hcfs:DerivedData
        dataTypeName="RRD for Point Cloud LiDAR"
        format="application/x-las-13"
        maxPointsHint="10000000"
        maxMegabytesHint="5.0"
        minRRDPercent="50.0"
        derivedDataAccessIntent="True"/>
     <hcfs:DerivedData
        dataTypeName="DEM"
        format="GeoTIFF"
        gsd="0.5"
        gsdUnits="meter"
        crs="EPSG:4326"
        compression="True"
        compressionCodec="Gzip"
        tile="True"
        tileWidth="1024"
        tileHeight="1024"
        codeValueDataType="f32"
        derivedDataAccessIntent="True"/>
   </hcfs:Policy>
</hcfs:PutPolicy>
```

An example of a RESTful HTTP POST request to send D to the data storage server program is provided below, as described above with respect to FIG. 4, FIG. 5, and FIG. 8. The service could return a file identifier per file in D to permit client-side data integrity management.

```
POST /hcfs-ingest-server HTTP/1.1
Host: example.com
Content-Type: multipart/mixed, boundary=--XXX
Content-Length: length
--XXX
Content-Type: text/xml; charset=utf-8
<?xml version="1.0" encoding="utf-8"?>
<hcfs:PutData xmlns:hcfs="http://www.example.com/hcfs" service=
"HiPERCloudFS" version="1.0.0"
dataType="PC-LiDAR-LAS" format="text/xml" fileCount="12"
policyIdentifier="3ff89845122e3cce4bbaad5ab2a8b3f2"/>
--XXX
Content-type: application/x-las-13
Content-Transfer-Encoding: binary
Content-Disposition: attachment; filename=filename.1000.las
Binary Data for filename.1000.las
...
--XXX
Content-type: application/x-las-13
Content-Transfer-Encoding: binary
Content-Disposition: attachment; filename=filename.1001.las
Binary Data for filename.1001.las
...
```

An example of a RESTful HTTP POST request to send both $P_D$ and D to the data storage server program is provided below, as described above with respect to FIG. 4, FIG. 5, and FIG. 8, an. The service could return a file identifier for file D to permit client-side data integrity management.

```
POST /hcfs-ingest-server HTTP/1.1
Host: example.com
Content-Type: multipart/mixed, boundary=--XXX
Content-Length: length
--XXX
Content-Type: text/xml; charset=utf-8
<?xml version="1.0" encoding="utf-8"?>
<hcfs:PutPolicyAndData xmlns:hcfs="http://www.example.com/hcfs"
service="HiPERCloudFS" version="1.0.0" dataType="PC-LiDAR-LAS"
format="application/x-las-13" fileCount="1" >
</hcfs:PutPolicyAndData>
--XXX
Content-type: text/xml; charset=utf-8
<?xml version="1.0" encoding="utf-8"?>
<hcfs:Policy
xmlns:hcfs="http://www.example.com/hcfs"
dataTypeName="Point Cloud LiDAR"
format="application/x-las-13"
derivedDataAccessIntent="True">
    <hcfs:filename>filename.1000.las</hcfs:filename>
    <hcfs:DerivedData
       dataTypeName="RRD for Point Cloud LiDAR"
       format="application/x-las-13"
       maxPointsHint="10000000"
       maxMegabytesHint="5.0"
       minRRDPercent="50.0"
       derivedDataAccessIntent="True"/>
    <hcfs:DerivedData
       dataTypeName="Metadata"
       format="text/xml"
       schema="http://someurl/path"
       schemaHint="OGC SensorML v1.0.0"
       derivedDataAccessIntent="True"/>
    <hcfs:DerivedData
       dataTypeName="DEM"
       format="GeoTIFF"
       gsd="0.5"
       gsdUnits="meter"
       crs="EPSG:4326"
       compression="True"
       compressionCodec="Gzip"
       tile="True"
       tileWidth="1024"
       tileHeight="1024"
       codeValueDataType="f32"
       derivedDataAccessIntent="True"/>
```

-continued

```
</hcfs:Policy>
--XXX
Content-type: application/x-las-13
Content-Transfer-Encoding: binary
Content-Disposition: attachment; filename=filename.1000.las
Binary Data for filename.1000.las
...
```

Figure 10:
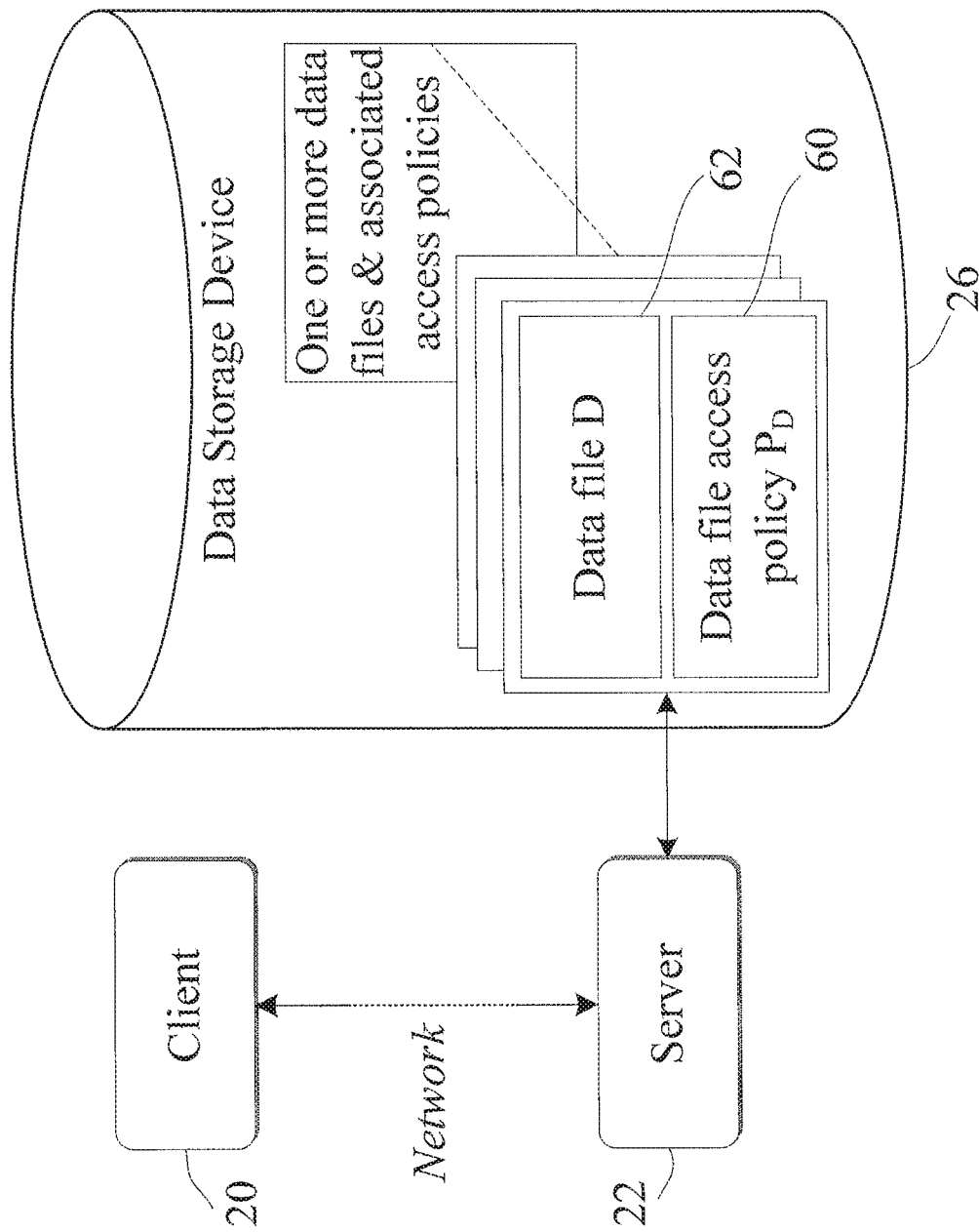
FIG. 10 depicts the workflow of a server program taking a one or more first data files and corresponding first data file virtualization policies and storing them to a storage device, according to an embodiment of the present invention.

FIG. 10 depicts the workflow of server program 22 taking one or more first data files and corresponding first data file virtualization policies and storing them to storage device 26, according to an embodiment of the present invention. As shown in FIG. 10, the server program 22 ingests one or more first data files D 60 into storage device 26. The server program 22 receives from the client program 20, a data virtualization policy $P_D$ 62 and one or more first data files 60. In one embodiment, the server program 22 stores the data virtualization policy $P_D$ 62 on the storage device 26 as a logical object, either as a file on the storage device 26 or as an object on an object storage device (OSD), or as entries in a database. The server program 22 associates each first data file D 60 in the one or more first data files with the corresponding data virtualization policy $P_D$ 62 as specified by the client program 20. The association is recorded on the storage device 26.

In one embodiment, the server program 22 provides a service to any interested and permitted client program 20 to get a directory listing of the first data file D 60, and a one or more one or more derived virtual data files $D_{1 \ldots N}$. The total number and type of derived virtual data files depends on the intent of a client program to access the total number and type of derived virtual data files, as specified in the data virtualization policy $P_D$ 62, where $P_D$ 62 is associated with the first data file D 60. The data file D 60 physically exists on the server-side storage device 26. A one or more second derived data files $D_{1 \ldots N}$ exist virtually on the server-side 26, i.e. the one or more second derived data files $D_{1 \ldots N}$ do not exist physically as a sequence of bytes on the server-side storage device 26, but the server program 22 presents to the client program 20 that such files exist.

Figure 11:
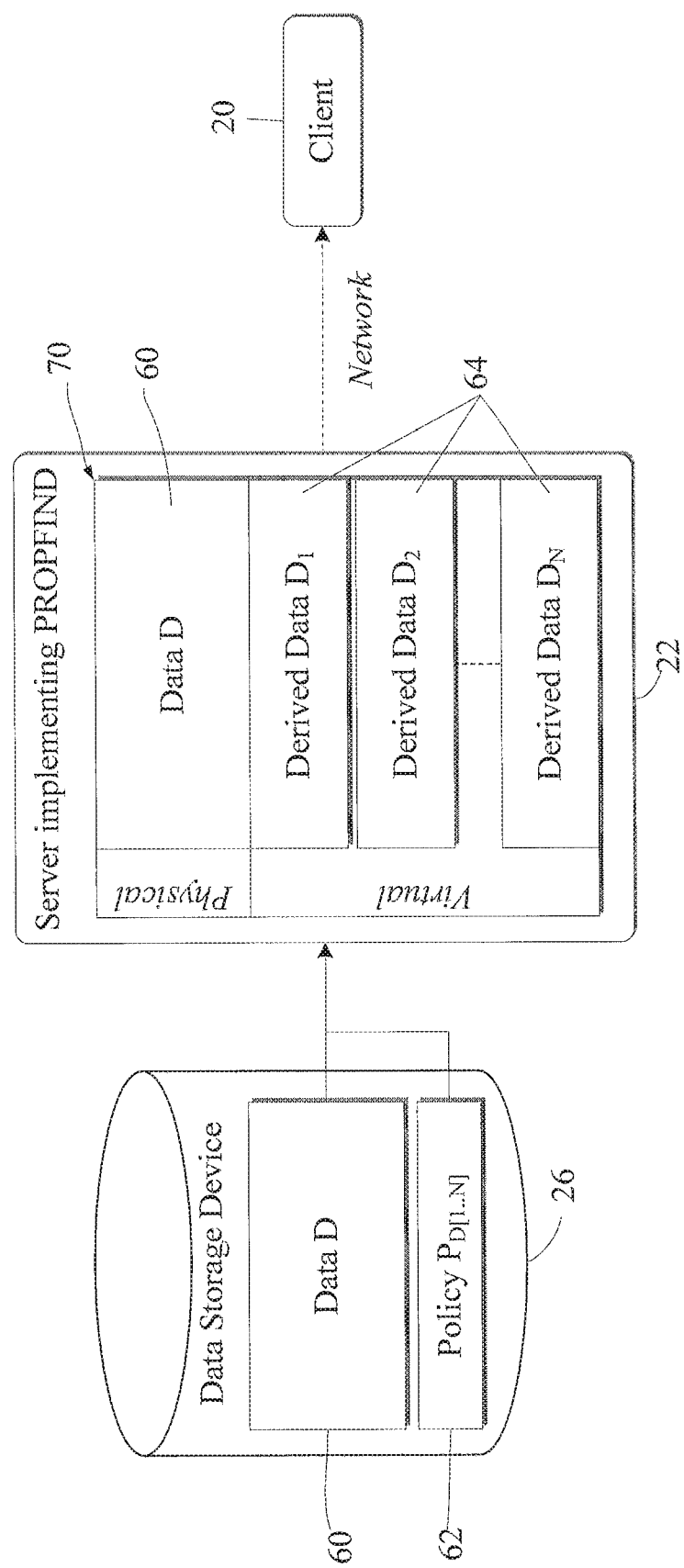
FIG. 11 depicts the workflow of a server program implementing a PROPFIND request in HTTP 1.1 WebDAV and presenting a directory listing of a first data file and a one or more virtual derived data files that were presented based on a first data file virtualization policy corresponding to the first data file, according to an embodiment of the present invention.

FIG. 11 depicts the workflow of server program 22 implementing a PROPFIND request in HTTP 1.1 WebDAV and presenting a directory listing of a first data file and one or more virtual derived data files that are presented based on a first data file virtualization policy corresponding to the first data file, according to an embodiment of the present invention. As shown in the workflow diagram in FIG. 11, the server program 22 provides an HTTP 1.1 WebDAV PROPFIND service 70 to provide such a directory listing. The directory list includes the first data file D 60 and a one or more virtual derived data files $D_{1 \ldots N}$ 64. The list of $D_{1 \ldots N}$ are derived using information from a first data file virtualization policy $P_{D[1 \ldots N]}$ 62 that is associated with data D 60.

Figure 12:
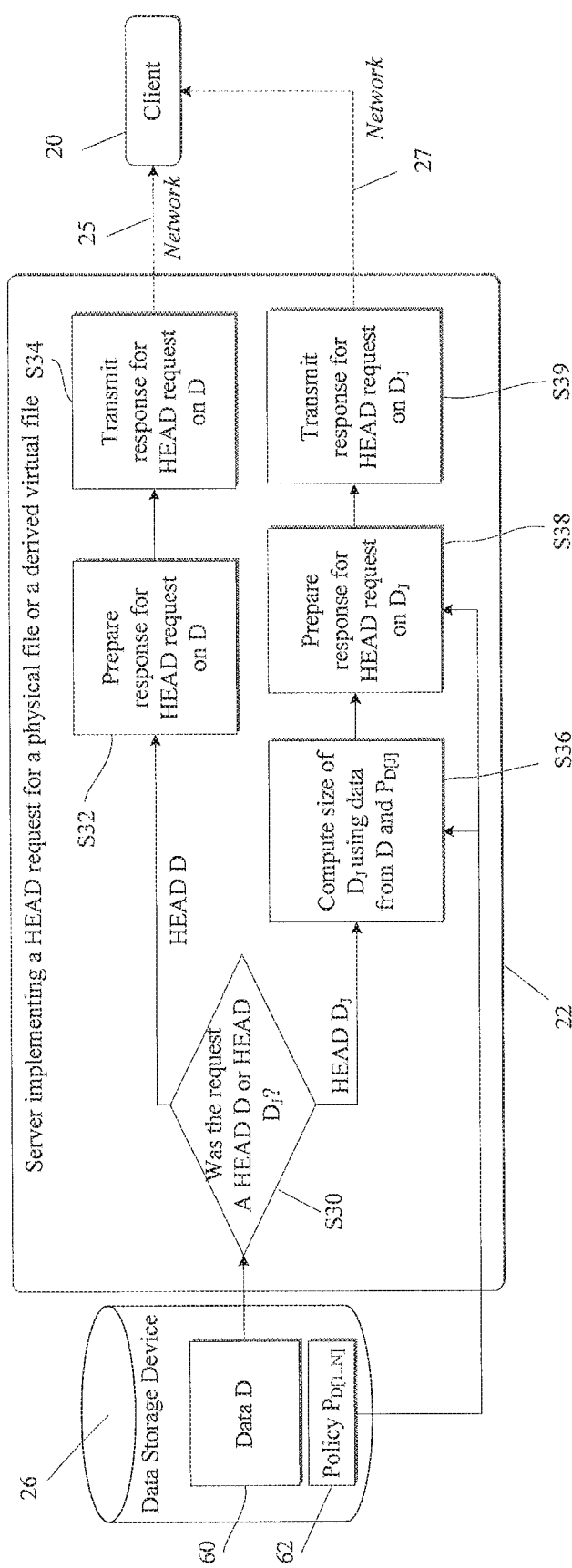
FIG. 12 depicts the workflow of a server program implementing a HTTP HEAD request for information on either a first data file or any corresponding virtual derived data file, according to an embodiment of the present invention.

FIG. 12 depicts the workflow of a server program implementing a HEAD request in HTTP 1.1 WebDAV for information on either a first data file or any corresponding virtual derived data file, according to an embodiment of the present invention. As shown in FIG. 12, the server program 22 fulfills an HTTP HEAD, for example HTTP 1.1 WebDAV HEAD or HTTP 1.1 HEAD request from the client program 20. At S30, the server program 22 checks to see if the request was made for the first data file D or for a derived data file $D_J$ from a one or more derived data files $D_{1 \ldots N}$. If the request was made for D, the server prepares, at S32, a response for D and transmits it, at S34, to the client program 20 over a computer network 25, for example, LAN or Internet. Hence, the client program 20 receives the response from the program server 22. If, on the other hand, the request was made for $D_J$, it is known to the server program 22 that $D_J$ does not exist on the storage device 26. $D_J$ is a virtual derived data file, derived from D 60, and based on $P_{D[J]}$ 62, which is the data virtualization policy for the virtual derived data file $D_J$ from the overall data virtualization policy $P_D$ 62 for data D 60. At S36, the server program 22 computes the size of $D_J$ using data from data D 60 and policy $P_{D[J]}$ 62. Following computing the size of $D_J$, the server 22 prepares a response for data D, at S38, and transmits the response, at S39, to the client program 20 over a computer network 27, for example, LAN or Internet. The network 27 can be the same as or different from the network 25.

Figure 13:
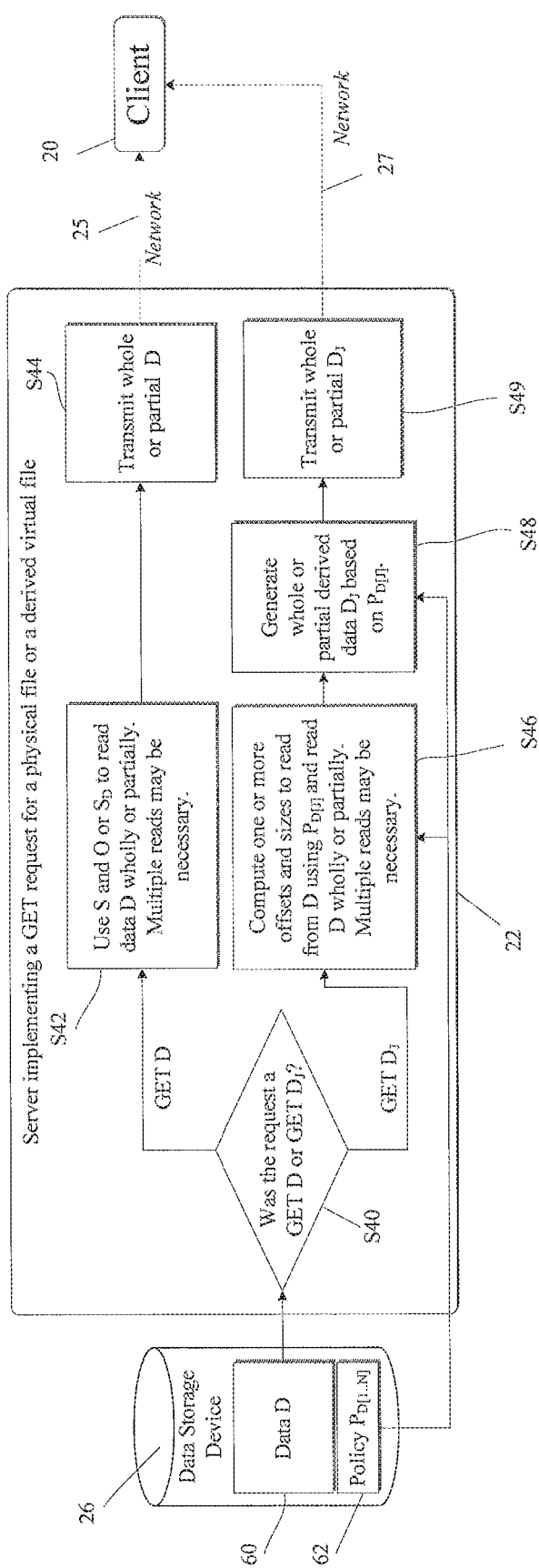
FIG. 13 depicts the workflow of a server program implementing a HTTP GET request for downloading data from either a first data file or any corresponding virtual derived data file, according to an embodiment of the present invention.

FIG. 13 depicts the workflow of a server program implementing an HTTP GET request, for example HTTP 1.1 WebDAV GET or HTTP 1.1 GET, for downloading data from either a first data file or any corresponding virtual derived data file, according to an embodiment of the present invention. As shown in FIG. 13, the server program 22 fulfills an HTTP GET request from the client program 20. The GET request can be made by the client program 20 to read data from a data file D 60 starting from file offset O, of S-bytes in size. The server program 22 checks, at S40, to see if the request is made for the first data file D 60 or for a derived data file $D_J$ from a one or more derived data files $D_{1 \ldots N}$. If the request is made for data D 60, the server prepares, at S42, a response for data D 60 and transmits the response, at S44, to the client program 20 over the computer network 25, for example, LAN or Internet. To prepare the response, the server program 22 has the request from the client program 20 to retrieve data from data D 60 starting from offset O, of size S. The size of the first data file D 60 is $S_D$ bytes, where $0 \leq O \leq S_D$ and $0 < (O+S) \leq S_D$. Using these values, at S42, the server program 22 reads S bytes from D, starting from offset O. The server program 22 prepares and transmits the response, at S44, to the client program 20. The client program 20 receives the response from the server program 22. If the request is made for $D_J$, the server program 22 knows that $D_J$ does not exist on the storage device 26. $D_J$ is a virtual derived data file, derived from data file D 60. The server program computes, at S46, the virtual size $S_{DJ}$ of $D_J$ using data from the first data file D 60 and the data virtualization policy $P_{D[J]}$ 62, which is the data virtualization policy for the virtual derived data file $D_J$ from the overall data virtualization policy $P_D$ for data file D. Using information from $P_{D[J]}$ 62 and data from data D 60, the server program 22 computes, at S46, one or more offsets and sizes within data D that are needed and sufficient to dynamically generate S virtual bytes, starting from virtual offset O from the virtual derived data file $D_J$. It may not be possible to compute what is needed from data D 60 to generate $D_J$. In that case, all data is read from data D 60. The server program 22 then reads the desired data from data D 60 and generates, at S48, derived data for $D_J$. The server program 22 then transmits, at S49, S bytes for $D_J$, starting from offset O. The client program 20 receives the response from the server program 22.

Figure 14:
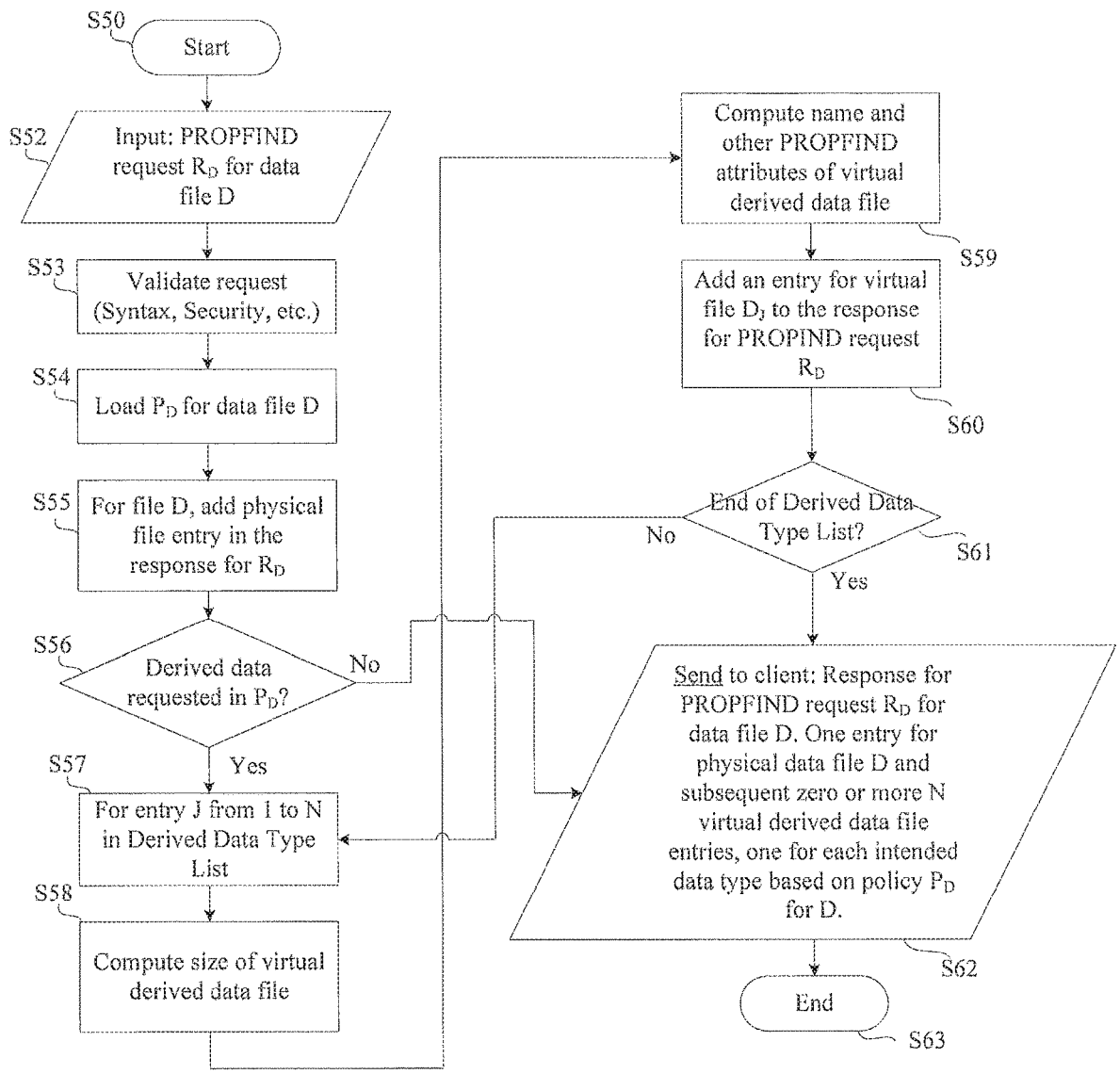
FIG. 14 depicts a flowchart of a server program implementing a PROPFIND request in HTTP 1.1 WebDAV, according to an embodiment of the present invention.

FIG. 14 depicts a flowchart of a server program 22 implementing a PROPFIND request in HTTP 1.1 WebDAV, according to an embodiment of the present invention. FIG. 14 is a flowchart of a method to implement the workflow shown in FIG. 11. The PROPFIND request is implemented to get a directory listing for a first data file D and a one or more virtual derived data files $D_{1 \ldots N}$. The method begins at S50. The server program 22 receives an HTTP 1.1 WebDAV PROPFIND request $R_D$ from client program 20, at S52. The intention of the client program 20 is to discover a first data file D, that the client program 20 had entrusted the server program 22. The PROPFIND request is made by the client program 20 requesting for a directory listing starting from the physical or virtual folder containing D, or any prior folder, with appropriate DEPTH option specified. At S53, the server program 22 validates $R_D$ to verify that the request is syntactically and semantically correct and that the requesting client 20 is permitted to access the data. If successful, the method loads, at S54, a first data file virtualization policy $P_D$ associated with D. At S55, the method prepares a directory listing entry for D as a response to the PROPFIND request $R_D$ (i.e., for file D, a physical file entry is added in response for Rd), including the pre-assigned name of a first data file D, the size $S_D$ (in bytes) of data D, and any additional attributes of data D that are permitted in a PROPFIND response for building a valid PROPFIND response by the server program 22. At S56, the method checks to see if the client 20 had expressed the intent of requesting additional virtual derived data files (i.e., to check whether derived data is requested in $P_D$). If yes, the method continues to S57. If no, the method continues to S62. At S57, the method loops for each entry J, from one or more entries 1 to N from $P_{D(1 \ldots N)}$. Each entry J in $P_{D(1 \ldots N)}$ refers to a virtual derived data file $D_J$ of a specific and defined data type, as defined by the client program in a prior upload of $P_D$, and its association with D. For each entry J, the method computes the size of a second derived data file D, at S58. At S59, the method further computes the name and remaining PROPFIND response attributes for $D_J$. The method then adds a directory list entry for a second derived data file $D_J$, at S60. The method then inquires if the end of derived data type list is reached, at S61. If yes, the loop has come to its end, when J is N, the method continues to S62, otherwise the method repeats the computing, etc. by providing a next entry J from 1 to N in the derived data type list, at S57. At S62, the method prepares a PROPFIND response comprising one file entry for data D and a one or more N virtual derived data file entries for a second virtual derived data files $D_{1 \ldots N}$. The method finally ends at S63.

Figure 15:
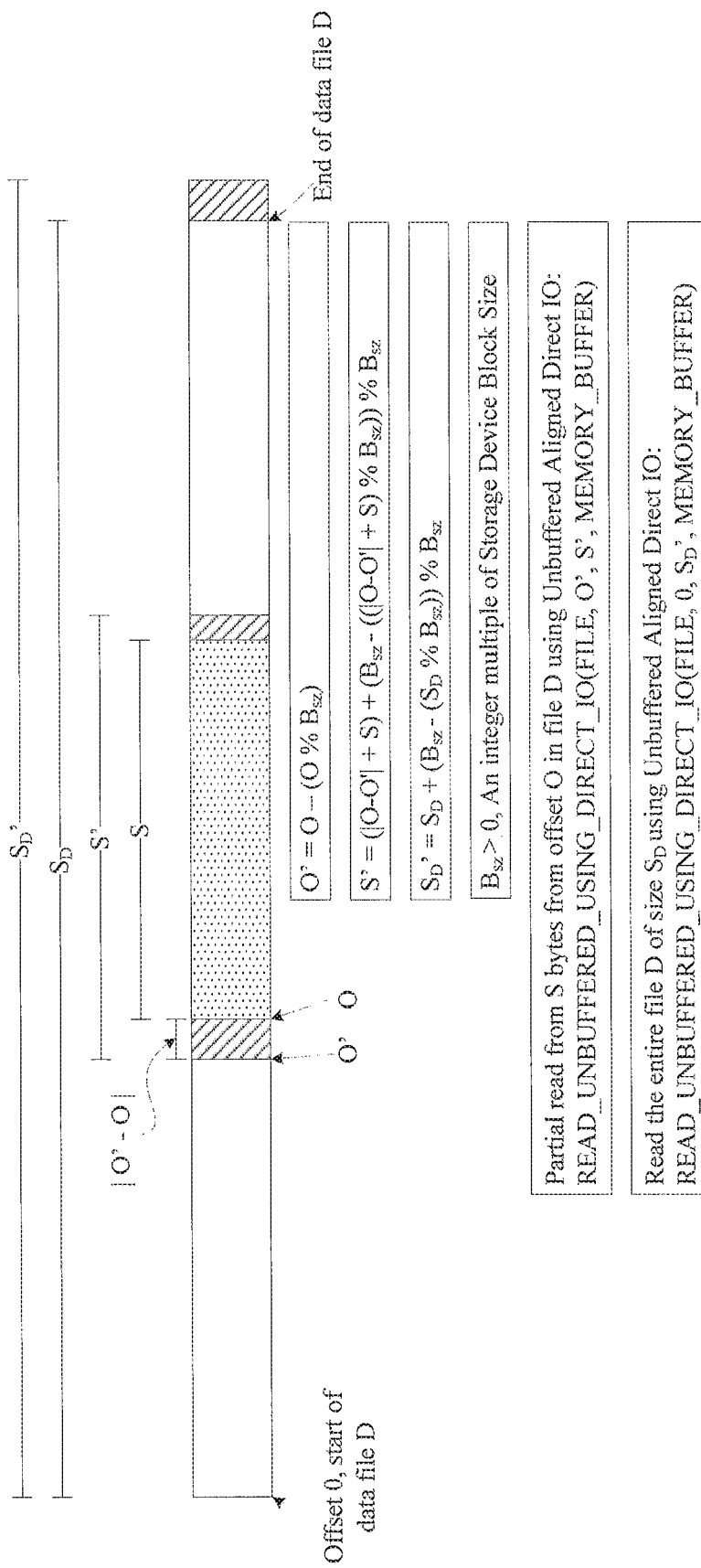
FIG. 15 depicts a schematic of an unbuffered aligned direct I/O operation on a first data file as implemented by a server program to fulfill a HTTP GET request, according to an embodiment of the present invention.

FIG. 15 depicts a schematic of an unbuffered aligned direct I/O operation on a first data file as implemented by a server program 22 to fulfill a HTTP GET request (e.g., a HTTP 1.1 WebDAV GET request), according to an embodiment of the present invention. FIG. 15 depicts the computation used to determine a file offset O' and file size S' from the first data file that is aligned to an integer multiple of the storage device block size, according to an embodiment of the present invention. A storage device block size is defined as the size in bytes of the smallest possible input-output (I/O) operation performed by a storage device management software program that manages the storage device 26 and implements the POSIX file system. For example, the storage device block size can be of any byte-size, such as 512 bytes, 1024 bytes, 2048 bytes, or 4096 bytes, etc. The symbol $B_{sz}$ denotes a value greater than zero, that is an integer multiple of the storage device block size. For example, a storage device block size can be 512 bytes and $B_{sz}$, as the integer multiple of a storage device block size, can be 512 bytes, 1024 bytes, 2048 bytes, or 4096 bytes, etc. As another example, a storage device block size can be 4096 bytes and $B_{sz}$, as the integer multiple of a storage device block size, can be 4096 bytes, 8192 bytes, or 16384 bytes, etc. A first data file D is of size $S_D$ bytes, where $S_D>0$ is shown in FIG. 15. The intent is to read either $S_D$ bytes from D starting the beginning of the file, or read S bytes from data file D, starting from offset O relative to the start of the file, where $0 \le O < S_D$, and $0 < O+S \le S_D$. As shown in FIG. 15, file offset 0 is the start of data file D. $S_D$ is the size of data file D in bytes and $S_D$ is greater than zero bytes. The intent is to read S bytes from data file D, from offset O. S is the size of the read operation. O is the starting offset for the read operation. A single large unbuffered aligned direct I/O read operation may involve programming of one or more unbuffered aligned direct I/O read operations. Together, they provide reading the desired number of bytes from the offset of the single large unbuffered aligned direct I/O read operation. All read operations follow the offset and size computations depicted herein. Each read request in the one or more unbuffered aligned direct I/O read operations may be issued in sequence or in parallel, synchronously or asynchronously, based on available features on specific file system and operating system implementations.

As shown in FIGS. 15, S and O may not be aligned to the storage device block size. To issue an unbuffered aligned direct I/O operation to read S bytes starting from offset O, we need to read S' bytes starting from offset O', where O' is defined is an offset from the start of file D that is less than O and the nearest value to O that is an integer multiple of the storage device block size. Thus, O' is an integer multiple of $B_{sz}$. The value of O' is computed based on the formula $O'=O-(O \% B_{sz})$. S' is the number of bytes to read starting from offset O', where S' is an integer multiple of the storage device block size, and S' is a value such that if a computer program issues a read request of size S' starting from O', then the computer program has read at least S bytes starting from offset O. The value of S' is computed based on the formula $S'=(|O-O'|+S)+(B_{sz}-((|O-O'|+S) \% B_{sz})) \% B_{sz}$. To read S bytes, starting from offset O from data file D, we issue an unbuffered aligned direct I/O read request to read aligned S' bytes, starting from aligned offset O', for example READ_UNBUFFERED_USING_DIRECT_IO( ), from a file, for example FILE, starting from offset O', of size S' bytes, into computer memory, for example MEMORY_BUFFER.

As it can be appreciated, the operation A % B between two integers A and B includes calculating the remainder of A divided by B. For example 1024% 512 is 0, 1023% 512 is 511, and 1025% 512 is 1. In A % B, the % operator is the modulo operator, representing the mathematical operation A modulo B, also represented as A mod B or A MOD B. The operation |A−B| between two integers A and B represents calculating the difference between A and B and taking the positive value of the difference between A and B. However, as it can be appreciated, if the difference between A and B is positive then the operation of taking the absolute value may not be needed. Therefore, the symbol |A−B| such as in |O−O'| should be interpreted herein broadly to mean calculating the difference between A and B with or without taking the absolute value of the difference.

As shown in FIG. 15, $S_D'$ is a value that is greater than or equal to $S_D$, and $S_D'$ is an integer multiple of $B_{sz}$. Its value is computed as $S_D'=S_D+(B_{sz}-(S_D \% B_{sz})) \% B_{sz}$. To read the entire file D, one needs to read $S_D$ bytes. Since we are using an unbuffered aligned direct I/O operation, we need to issue a read request of size aligned to $B_{sz}$. That size is $S_D'$. To read entire file D, of size $S_D$, we issue an unbuffered aligned direct I/O read function, for example READ_UNBUFFERED_USING_DIRECT_IO( ), from a file, for example FILE, starting from offset 0, of size $S_D'$ bytes, into computer memory, for example MEMORY_BUFFER.

Figure 16:
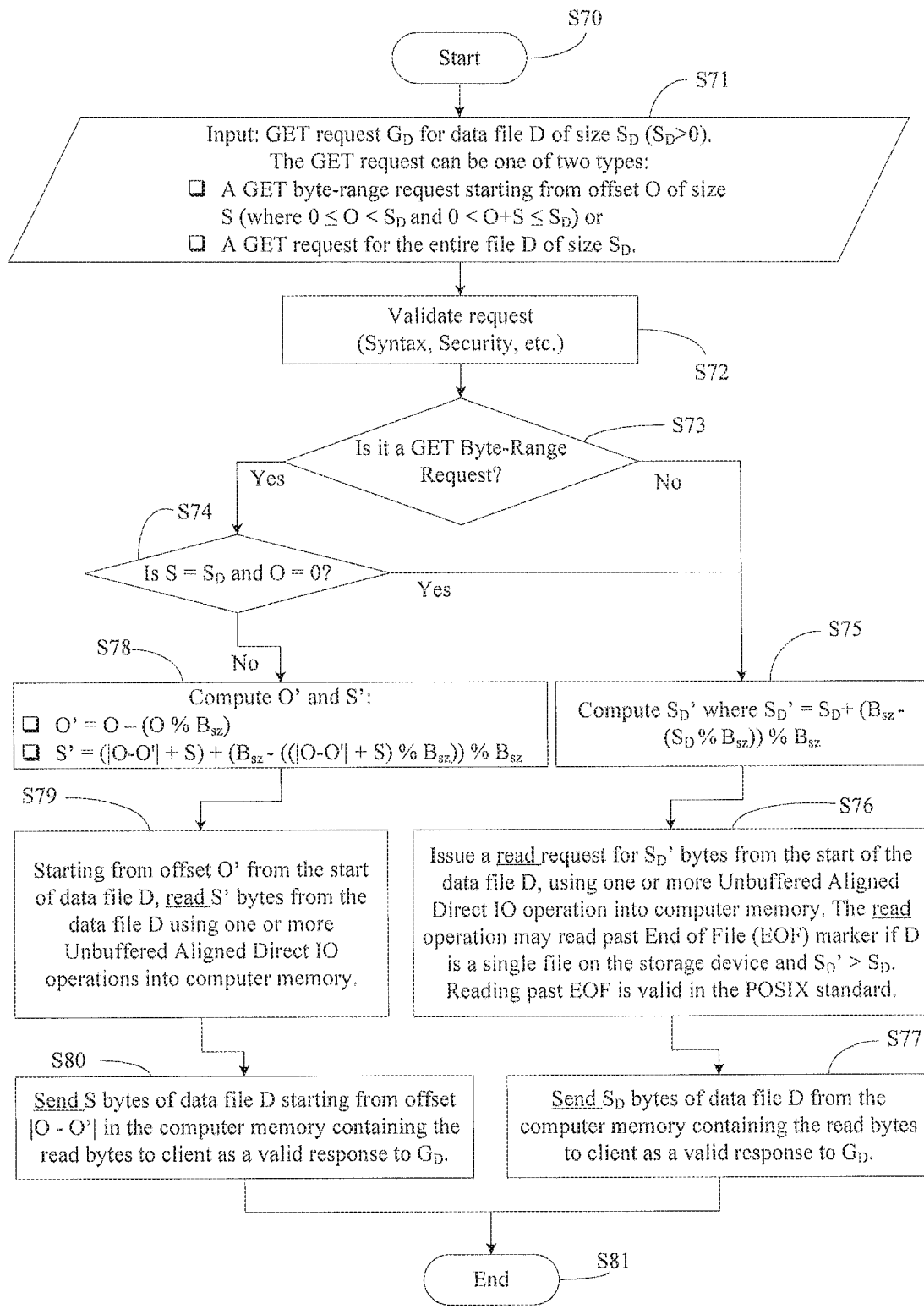
FIG. 16 depicts a flowchart of a server program implementing a HTTP GET request for reading whole or part of a first data file using one or more unbuffered aligned direct I/O operations, according to an embodiment of the present invention.

FIG. 16 depicts a flowchart of method of implementing a HTTP GET request (e.g., a HTTP 1.1 WebDAV GET request) for reading whole or part of a first data file using one or more unbuffered aligned direct I/O operations, by a server program 22, according to an embodiment of the present invention. The method includes reading data from file D using an unbuffered (also known as non-cached) Direct I/O method reading bytes that are an integer multiple of $B_{sz}$, from a file offset that is also an integer multiple of $B_{sz}$. $B_{sz}$ is in turn an integer multiple of the storage device block size. In one embodiment, the method implements a part of the workflow specified in FIG. 13 that requests for data from the first data file D.

As shown in FIG. 16, the method begins at S70. The server program 22 receives a HTTP GET request $G_D$ from a client program 20, at S71. At S71, in the GET request $G_D$, a client program 20 has requested for one of two possible types of a GET request. The client program 20 has either issued a first request of type GET byte-range to GET one or more S-bytes starting from offset O from a first data file D or has issued a second request to GET the entire data file D, where the size data file D is $S_D$ bytes and $S_D$ is greater than 0. The first request size of one or more S-bytes starting from offset of O, such that O is greater than or equal to zero and S+O is less than or equal to $S_D$. At S72 the request is validated, for example for request syntax correctness, valid data range, existence of the file, and security access rights. At S73 the method checks to see if the request was a first GET byte-range request or a second request to get the entire data file D. If it was a first GET byte-range request, then the method continues at S74. If it was not a GET byte-range request, then it was a second request to get the entire data file D of size $S_D$, and the method continues at S75. At S74, the method checks if the GET byte-range request asked for the entire file, that is, it checks to see if S is $S_D$ and of O is zero. If yes, the first byte-range request is equivalent to the second request to get the entire file, and the method continues at S75. If no, the first byte-range request continues at S78.

As shown in FIG. 16, at S75, the method computes $S_D'$ that is aligned to $B_{sz}$, an integer multiple of the storage device block size using the formula $S_D'=S_D+(B_{sz}-(S_D \% B_{sz})) \% B_{sz}$. At S76, the method issues a read request for $S_D'$ bytes from the start of data file D. The read request includes one or more Unbuffered Aligned Direct IO read operations, also aligned to $B_{sz}$. The requested data is transferred into computer memory. Since $S_D'$ may be greater than $S_D$, and since $S_D$ is the size of the data file D, the read operation may request for data past the end of file (EOF) marker. Reading past the EOF marker is permitted in the POSIX standard. At S77, $S_D$ bytes of data file D are transmitted or sent from computer memory to the client program 20 over a computer network as part of a response to the GET request $G_D$. The method ends at S81.

As shown in FIG. 16, just prior to S78, the method has verified that the request is a first GET byte-range request for S-bytes starting from offset O within the data file D. At S78, the method computes S' and O', aligned to $B_{sz}$, an integer multiple of the storage device block size, using the formulae O'=O−(O % $B_{sz}$) and S'=(|O−O'|+S)+($B_{sz}$−((|O−O'|+S) % $B_{sz}$)) % $B_{sz}$. At S79, the method issues a read request to read S' bytes starting from offset O' relative to the start of data file D. The read request includes one or more Unbuffered Aligned Direct IO read operations, also aligned to $B_{sz}$. The requested data is transferred into computer memory. The first GET byte-range request asked for data starting from offset O. Bytes from offset O' to O were not requested. In computer memory, the bytes start from offset O'. Therefore, at S80, the method sends or transmits S-bytes starting from offset |O−O'| in the computer memory as a valid response to the GET request $G_D$, to the client program 20 over a computer network. The method ends at S81.

Figure 17:
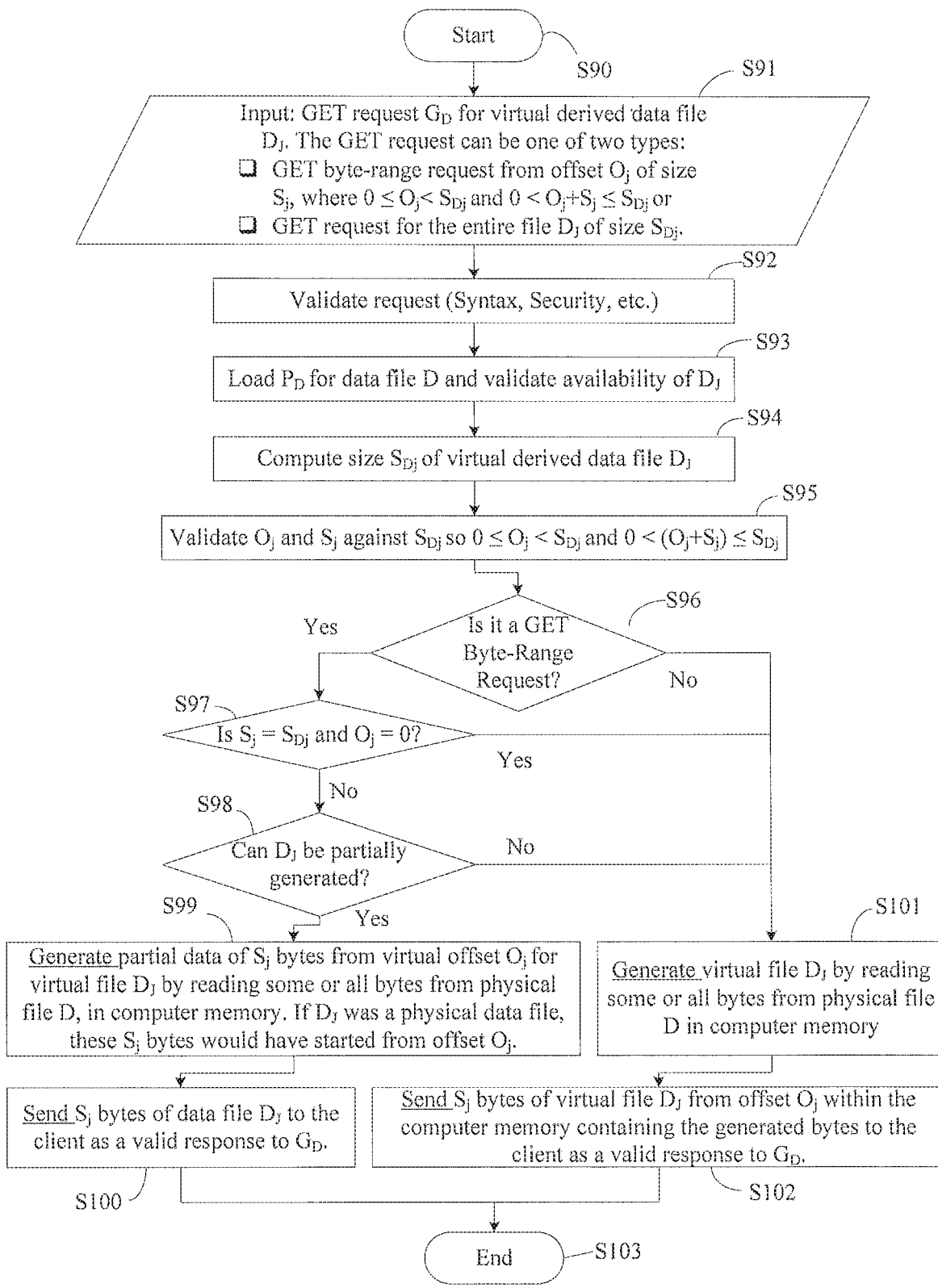
FIG. 17 depicts a flowchart of a server program implementing a HTTP GET request for reading whole or part of a second virtual derived data file using one or more unbuffered aligned direct I/O operations on a first data file and using a first data file virtualization policy, according to an embodiment of the present invention.

FIG. 17 depicts a flowchart of a server program 22 implementing a HTTP GET request (e.g., a HTTP 1.1 WebDAV GET request) for reading whole or part of a second virtual derived data file using one or more unbuffered aligned direct I/O operations on a first data file denoted by D and using a first data file virtualization policy denoted by $P_{D[1 \ldots N]}$ or $P_D$, according to an embodiment of the present invention. In one embodiment, the method implements a part of the method described in FIG. 13. The method dynamically computes and derives data for a second virtual derived data file $D_J$ where $D_J$ is one of virtual derived data files derived from a first data file D and first data file virtualization policy $P_D$. The derived data file $D_J$ does not exist physically on a computer storage device. It is generated dynamically by the server program 22 on demand.

As shown in FIG. 17, the method begins at S90. The server program 22 receives a HTTP GET request $G_D$ from a client program 20 at S91. In $G_D$, the client program 20 has issued either a GET byte-range request for a one or more $S_j$-bytes starting from offset $O_j$ from a second virtual derived data file $D_J$ or has issued a GET request to retrieve the entire second virtual derived data file $D_J$. The request $G_D$ is validated at S92 for example, for syntax, and security. The server program 22 loads the data virtualization policy $P_D$, associated with D and validates $D_J$ as a valid deliverable virtual derived data file, at S93. Using $P_D$ and D, the size $S_{DJ}$ of $D_J$ is computed at S94. The values of $O_j$ and $S_j$ are validated against $S_{Dj}$, such that $0 \le O_j < S_{Dj}$, and $0 < O_j + S_j \le S_{Dj}$ at S95. At S96, the method checks to see if the GET request is a byte-range request or not a byte-range request, i.e. a request to GET the entire $S_{Dj}$ bytes from the virtual derived data file D. If the GET request is a byte-range request, the method continues to S97. At S97, the method further checks if $S_j = S_{Dj}$ and $O_j = 0$. If yes, the method continues to S98. If not, the method continues to S101. At S98, the method checks if partial data can be generated for $D_J$ at all. If yes, the method continues to S99, else the method continues to S101.

As shown in FIG. 17, at S99, the method generates partial data for virtual file $D_J$, by reading and processing some or all bytes from the first data file D. The partial data is $S_j$ bytes in size and represents data within the virtual derived data file $D_J$, starting from virtual offset $O_j$, as if it were a physical file on a storage device. The method then continues to S100 where the S bytes are transmitted or sent to a client program 20 as part of the response to $G_D$. At S101, the method generates the complete $S_{Dj}$ bytes for $D_J$ in computer memory, using data in $P_D$ and reading D as a whole or in part. The method then transmits, at S102, $S_j$ bytes starting from offset $O_j$ from the $S_{Dj}$ bytes of computer memory, to client program 20 as part of the response to $G_D$. The method ends at S103. When reading from the first data file D, one or more unbuffered aligned direct I/O read operations are performed. Each read operation reads a specified number of bytes that are an integer multiple of $B_{SZ}$, from an offset that is an integer multiple of $B_{SZ}$, where $B_{SZ}$ is an integer multiple of the storage device block size of the storage devices containing the data, and is based on the method depicted in FIG. 15.

Various parts of the embodiments of the present invention perform one or more read operations from a first data file D, for example as specified in S76 and S79 in the flowchart depicted in FIG. 16 and in S99 and S101 in the flowchart depicted in FIG. 17. The read operation itself is implemented using an interface based on the POSIX standard. To read data starting from any offset O, an aligned offset O'=O−(O % $B_{sz}$) is computed. To read any S-bytes starting from any offset O, an aligned size S'=(|O−O'|+S)+($B_{sz}$−((|O−O'|+S) % $B_{sz}$)) % $B_{sz}$ is computed. A read operation starting at O', and having a size of S' bytes is sufficient to efficiently read all data starting from O and having a size of S bytes. If, for example, the entire data file D of size $S_D$ is to be read, an aligned size $S_D$'=$S_D$+($B_{sz}$−($S_D$ % $B_{sz}$)) % $B_{sz}$ is computed. $S_D$' can be past the end of first data file D. The POSIX specification permits a read operation past the end of a data file. If the S' is too large in size, the read request can be broken up into more than one read requests, each of a size that is an integer multiple of $B_{sz}$. $B_{sz}$ is an integer multiple of the storage device block size of the storage devices containing the data.

As it can be appreciated from the above paragraphs, a server program is a computer program that is configured to run on a computer system (e.g., a computer server having one or more processors), and a client program is a computer program that is configured to run on a computer system (e.g., a client computer having one or more processors). The computer systems running the client program and the server program can be the same or different computer systems. The computer system running the server program or the computer system running the client program, or both, can include one or more computers. The client program may be running on one or more computers. Similarly, the server program may be running on one or more computers. The computer systems running client programs and server programs communicate with each other over a network. The network may be a wired network, a wireless network (e.g., a cellular network), the internet, etc.

In some embodiments, programs for performing the methods or services in accordance with embodiments of the invention can be embodied as program products in a computer system such as a personal computer or server or in a distributed computing environment comprising a plurality of computers. The computer may include, for example, a desktop computer, a laptop computer, a handheld computing device such as a PDA, a tablet, etc. The computer program (e.g., server program, client program) products may include a computer readable medium or storage medium or media having instructions stored thereon used to program a computer to perform the methods described above. Examples of suitable storage medium or media include any type of disk including floppy disks, optical disks, DVDs, CD ROMs, magnetic optical disks, RAMs, EPROMs, EEPROMs, magnetic or optical cards, hard disk, flash card (e.g., a USB flash card), PCMCIA memory card, smart card, or other media. Alternatively, a portion or the whole computer program product can be downloaded from a remote computer or server via a network such as the internet, an ATM network, a wide area network (WAN) or a local area network.

Stored on one or more of the computer readable media, the program may include software for controlling both the hardware of a general purpose or specialized computer or processor. The software also enables the computer or processor to interact with a user via output devices such as a graphical user interface, head mounted display (HMD), etc. The software may also include, but is not limited to, device drivers, operating systems and user applications.

Alternatively, instead or in addition to implementing the methods described above as computer program product(s) (e.g., as software products) embodied in a computer, the method described above can be implemented as hardware in which for example an application specific integrated circuit (ASIC) or graphics processing unit or units (GPU) can be designed to implement the method or methods of the present invention.

The various databases described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

Although the various steps of the above method(s) are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

The invention claimed is:

1. A method of requesting information from a server, the method being implemented by one or more processors configured to execute instructions, which, when executed, cause the one or more processors to:
send, by a client to a server, a hypertext transfer protocol (HTTP) GET request to retrieve at least a portion of at least one derived data file, wherein the at least one derived data file is dynamically generated by the server in response to the request using a data file virtualization policy and at least a portion of a data file, the data file virtualization policy and the data file being stored in a storage accessible by the server, and wherein the dynamic generation comprises an aligned unbuffered direct read operation from the stored data file of a data size that is aligned to an integer multiple of the storage's block size; and
receive, by the client from the server, at least the portion of the at least one derived data file.

2. The method according to claim 1, wherein the stored data file is stored in the storage among one or more other data files, the stored data file and the one or more other data files being of a same type, and wherein the at least one derived data file is not stored in the storage.

3. The method according to claim 2, wherein the data file virtualization policy is associated in a one-to-many relationship with the stored data file and the one or more other data files.

4. The method according to claim 1, wherein the one or more processors are further caused to:
   send, by the client to the server, a request for a list of supported derived data types and a list of supported parameters for each of the supported derived data types, wherein the parameters allow a client to control an output of the at least one derived data file;
   receive, by the client from the server, the list of supported parameters; and
   send, by the client, an intent to request data of at least a subset of the supported derived data types.

5. The method according to claim 1, wherein the data file virtualization policy comprises:
   a name of the stored data file,
   a data type of the stored data file,
   a Boolean flag set to either True or False, True indicating an intent of the client to request for derived data, and
   a list of derived data types that the client intends to retrieve.

6. The method according to claim 5, wherein the at least one derived data file comprises a plurality of dynamically generated derived data files, a number of the plurality of derived data files being based on the intent of the client to retrieve them.

7. The method according to claim 1, wherein the stored data file comprises Wide-Area Motion Imagery (WAMI) data, a type of the stored data file being a WAMI Frame.

8. The method according to claim 1, wherein the one or more processors are further caused to:
   send, by the client to the server, a request for a list of supported derived data types;
   receive, by the client, the list of supported derived data types; and
   generate, by the client, the data file virtualization policy using the list of supported derived data types.

9. The method according to claim 1, wherein the at least one derived data file is listed in a directory listing generated by the server, and
   wherein the directory listing is accessible to the client such that the at least one derived data file is presented to the client as if the at least one derived data file is stored in the storage.

10. The method according to claim 9, wherein the one or more processors are further caused to:
    send, by the client to the server, an HTTP 1.1 WebDAV PROPFIND request for the directory listing.

11. A system, comprising:
    a client computer system comprising one or more processors and a network connection to a server computer system, the client computer system being configured to:
    send, to a server computer system, a hypertext transfer protocol (HTTP) GET request to retrieve at least a portion of at least one derived data file, wherein the at least one derived data file is dynamically generated by the server computer system in response to the request using a data file virtualization policy and at least a portion of a data file, the data file virtualization policy and the data file being stored in a storage accessible by the server computer system, and
    wherein the dynamic generation comprises an aligned unbuffered direct read operation from the stored data file of a data size that is aligned to an integer multiple of the storage's block size; and
    receive, from the server computer system, at least the portion of the at least one derived data file.

12. The system according to claim 11, wherein the stored data file is stored in the storage among one or more other data files, the stored data file and the one or more other data files being of a same type, and wherein the at least one derived data file is not stored in the storage.

13. The system according to claim 12, wherein the data file virtualization policy is associated in a one-to-many relationship with the stored data file and the one or more other data files.

14. The system according to claim 11, wherein the client computer system is further configured to:
    send, to the server computer system, a request for a list of supported derived data types and a list of supported parameters for each of the supported derived data types, wherein the parameters allow a client to control an output of the at least one derived data file;
    receive, from the server computer system, the list of supported parameters; and
    send an intent to request data of at least a subset of the supported derived data types.

15. The system according to claim 11, wherein the data file virtualization policy comprises:
    a name of the stored data file,
    a data type of the stored data file,
    a Boolean flag set to either True or False, True indicating an intent of the client computer system to request for derived data, and
    a list of derived data types that the client computer system intends to retrieve.

16. The system according to claim 15, wherein the at least one derived data file comprises a plurality of dynamically generated derived data files, a number of the plurality of derived data files being based on the intent of the client computer system to retrieve them.

17. The system according to claim 11, wherein the stored data file comprises Wide-Area Motion Imagery (WAMI) data, a type of the stored data file being a WAMI Frame.

18. The system according to claim 11, wherein the client computer system is further configured to:
    send, to the server computer system, a request for a list of supported derived data types;
    receive the list of supported derived data types; and
    generate the data file virtualization policy using the list of supported derived data types.

19. The system according to claim 11, wherein the at least one derived data file is listed in a directory listing generated by the server computer system, and
    wherein the directory listing is accessible to the client computer system such that the at least one derived data file is presented to the client computer system as if the at least one derived data file is stored in the storage.

20. The system according to claim 19, wherein the client computer system is further configured to:
    send, to the server computer system, an HTTP 1.1 WebDAV PROPFIND request for the directory listing.

* * * * *